US009684737B2

(12) United States Patent
Steinmacher-Burow

(10) Patent No.: US 9,684,737 B2
(45) Date of Patent: Jun. 20, 2017

(54) ACCESSING AN N-WAY LINKED LIST

(71) Applicant: International Business Machines Corporation, Armonk, NY (US)

(72) Inventor: Burkhard Steinmacher-Burow, Esslingen (DE)

(73) Assignee: International Business Machines Corporation, Armonk, NY (US)

(*) Notice: Subject to any disclaimer, the term of this patent is extended or adjusted under 35 U.S.C. 154(b) by 645 days.

(21) Appl. No.: 14/182,909

(22) Filed: Feb. 18, 2014

(65) Prior Publication Data

US 2015/0234934 A1    Aug. 20, 2015

(51) Int. Cl.
G06F 17/30 (2006.01)
G06F 12/02 (2006.01)
G06F 3/0482 (2013.01)
G06F 3/0489 (2013.01)

(52) U.S. Cl.
CPC ...... *G06F 17/30958* (2013.01); *G06F 12/023* (2013.01); *G06F 3/0482* (2013.01); *G06F 3/0489* (2013.01)

(58) Field of Classification Search
CPC . G06F 17/30598; G06F 3/0482; G06F 3/0489
USPC .......................................... 707/800
See application file for complete search history.

(56) References Cited

U.S. PATENT DOCUMENTS

| 5,153,591 | A  | * | 10/1992 | Clark ............... H03M 7/3088 341/51 |
| 5,319,778 | A  | * | 6/1994  | Catino ............ G06F 17/30958 707/802 |
| 5,924,098 | A  | * | 7/1999  | Kluge ................. G06F 9/52 707/723 |
| 6,651,146 | B1 | * | 11/2003 | Srinivas ............... G06F 5/10 711/150 |
| 6,848,029 | B2 | * | 1/2005  | Coldewey ......... G06F 12/0862 707/669 |
| 7,058,636 | B2 | * | 6/2006  | Coldewey ............ G06F 8/4442 707/704 |
| 7,389,291 | B1 | * | 6/2008  | Shavit ................ G06F 9/526 707/802 |
| 8,224,799 | B2 | * | 7/2012  | Song ............... G06F 17/30958 707/704 |
| 8,295,292 | B2 | * | 10/2012 | Tse ................ G06F 17/30958 370/400 |
| 2001/0052062 | A1 | * | 12/2001 | Lipovski ............. G11C 7/065 712/32 |

(Continued)

OTHER PUBLICATIONS

"Advanced Vector Extensions", Wikipedia the free Encyclopedia, Printed Feb. 17, 2014. http://en.wikipedia.org/wiki/Advanced_Vector_Extensions.

(Continued)

*Primary Examiner* — Shahid Alam
(74) *Attorney, Agent, or Firm* — Daniel C. Housley

(57) ABSTRACT

Computer-implemented methods for accessing a particular element of a plurality of elements stored in an N-way linked list in a computer memory provide for adding or removing elements at locations within the list. The methods may be employed with LIFO or FIFO N-way linked lists. The methods may include traversing the N sub-lists in parallel as well as the use of single instruction multiple data operations.

12 Claims, 22 Drawing Sheets

(56) References Cited

U.S. PATENT DOCUMENTS

| | | | |
|---|---|---|---|
| 2007/0156685 A1* | 7/2007 | Inoue | G06F 7/36 707/724 |
| 2007/0240224 A1* | 10/2007 | Agrawal | G06F 17/30445 726/25 |
| 2008/0316214 A1* | 12/2008 | Peeper | G06T 15/005 345/501 |
| 2011/0010347 A1* | 1/2011 | Cheriton | G11C 15/00 707/692 |
| 2011/0264687 A1* | 10/2011 | Surtani | G06F 17/30949 707/769 |
| 2015/0234655 A1 | 8/2015 | Steinmacher-Burow | |
| 2015/0234934 A1 | 8/2015 | Steinmacher-Burow | |

OTHER PUBLICATIONS

"Benchmarks: Measuring Cache and Memory Latency (access patterns, paging and TLBs)", SiSoftware, © SiSoftware 1995-Present. http://www.sisoftware.net/?d=au&f=ben_mem_latency.

"Class LinkedList<E>", Java Platform Standard Ed. 6, Copyright © 1993, 2011, Oracle and/or its affiliates . http://docs.oracle.com/javase/6/docs/api/java/util/LinkedList.html.

Coldewey, D., "Coping with Memory Latency: Restructuring General-Purpose Programs to Cope with Memory Latency", Interim Project Report, UCSC-CRL-97-06, Board of Studies in Computer and Information Sciences, University of California, Santa Cruz, Mar. 20, 1997, pp. 1-27.

"Concurrent linked list", Stackoverflow.com, Posted Nov. 12, 2012, Updated Jul. 24, 2011. stackoverflow.com/questions/4167624/concurrent-linked-list.

CPU World, "Intel Core i7-2720QM", © Copyright 2003-2010 Gennadiy Shvets. www.cpu-world.com/CPUs/Core_i7?Intel-Core%20i7%20Mobile%2017-2720QM%20FF8062700835817.html.

Frias et al., "Single-Pass List Partitioning", Scalable Computing: Practice and Experience, vol. 9, No. 3, pp. 179-184, © 2008 SCPE, ISSN 1895-1767.

Frias et al., "Single-Pass List Partitioning", MCSTL: The Multi-Core Standard Template Library, 2008 International Workshop on Multi-Core Computing Systems (MuCoCo '08). algo2.iti.kit.edu/singer/mcstl/Listpartitioning.pdf.

Giacaman et al., "Parallel iterator for parallelising object oriented applications", 7th WSEAS International Conference on Software Engineering, Parallel and Distributed Systems (SEPADS '08), University of Cambridge, UK, Feb. 2008, pp. 44-49. ISSN 1790-5117.

"Hash Table", Wikipedia the free encyclopedia, Printed Aug. 7, 2013. http://en.wikipedia.org/wiki/Hash_table#Separate_chaining_with_linked_lists.

Hedström, K., "Number crunching: Why you should never, ever, EVER use linked-list in your code again", Code Project, Posted Mar. 5, 2012, article copyright 2012 by Kjellkod.cc. http://www.codeproject.com/Articles/340797/Number-crunching-Why-you-should-never-ever-EVER-us.

Intel, "Out of Order Loading", Forum, Platform and Technology Discussion, Intel Corporation, first posted Sep. 9, 2011. http://software.intel.com/en-us/forums/topic/282068.

"Intel® 64 and IA-32 Architectures Optimization Reference Manual", Chapter 3: General Optimization Guidelines, Section 3.6.1: Load and Store Execution Bandwidth, Intel Corporation, Jul. 2013, © 1997-2013 Intel Corporation. http://www.intel.com/content/www/us/en/architecture-and-technology/64-is-32-architectures-optimization-manual.html.

"Iterator", Wikipedia the free encyclopedia, Printed Aug. 7, 2013. http://en.wikipedia.org/wiki/Iterator.

Karlsson et al., "A Prefetching Technique for Irregular Accesses to Linked Data Structures", HPCA-6 Proceedings: Sixth International Symposium on High-Performance Computer Architecture, 2000, pp. 206-217. DOI: 10.1109/HPCA.2000.824351.

"Linked list", Wikipedia the free encyclopedia, Printed Aug. 7, 2013. http://en.wikipedia.org/wiki/Linked_list.

"List (abstract data type)", Wikipedia the free encyclopedia, Printed Aug. 7, 2013. http://en.wikipedia.org/wiki/List_%28abstract_data_%type%29.

Mellor-Crummey, J., "Concurrent Queues: Practical Fetch-and-Phi Algorithms", Technical Report 229, Department of Computer Science, University of Rochester, Nov. 1987, pp. 1-27. http://www.cs.rice.edu/~johnmc/pubs-area.html.

Morrison et al., "Fast Concurrent Queues for x86 Processors", PPoPP '13: Proceedings of the 18th ACM SIGPLAN symposium on Principles and Practice of Parallel programming, Feb. 2013, © 2013 ACM. DOI: 10.1145/2442516.2442527.

"Open MP", Wikipedia the free encyclopedia, Printed Aug. 7, 2013. http://en.wikipedia.org/wiki/openMP.

Orozco et al., "Toward High Throughput Algorithms on Many Core Architectures", ACM Transactions on Architecture and Code Optimization (TACO), vol. 8, No. 4, Article 49, Published Jan. 2012, pp. 1-21, © 2012 ACM. DOI: 10.1145/2086696.2086728.

Roth et al., "Effective Jump-Pointer Prefetching for Linked Data Structures", ISCA '99: Proceedings of the 26th annual international symposium on Computer Architecture, May 1999. ftp://ftp.cs.wisc.edu/sohi/papers/1999/jmp-ptr.isca.pdf.

Sanderson, P., "C SC 205 Lecture 10: Singly-Linked Lists", Oct. 2007, Otterbein University. faculty.otterbein.edu/PSanderson/csc205/notes/lecture10.html.

"Sandy Bridge", Wikipedia the free encyclopedia, printed: Aug. 8, 2013. http://en.wikipedia.org/wiki/Sandy_Bridge.

Suleman, A., "Quick Post: Should you ever use Linked-Lists?", Future Chips, Jun. 25, 2011, © 2012 Future Chips. www.futurechips.org/thoughts-for-researchers/quick-post-linked-lists.html.

Totoo, P., "Inherently Parallel Data Structures", Thesis submitted in partial fulfillment of the requirements Master of Science in Advanced Internet Applications, School of Mathematical and Computer Sciences, Heriot-Watt University, Aug. 2011.

"XOR linked list", Wikipedia the free encyclopedia, Printed Aug. 7, 2013. http://en.wikipedia.org/wiki/XOR_linked_list.

Steinmacher-Burow, "Atomic Memory Operations on an N-Way Linked List," U.S. Appl. No. 15/065,070, filed Mar. 9, 2016.

Steinmacher-Burow, "Atomic Memory Operations on an N-way Linked List", U.S. Appl. No. 14/182,932, filed Feb. 18, 2014.

* cited by examiner

ACCESSING AN N-WAY LINKED LIST

BACKGROUND

This disclosure relates generally to data structures stored in computer memory, and more particularly, to accessing elements in data structures stored in computer memory.

Some currently available processors support single instruction, multiple data (SIMD) operations. A SIMD operation is an operation in which a single instruction operates on two or more data elements items in parallel. For example, a SIMD load instruction may load eight 16-bit values in parallel. In this example, in the same number of clock cycles needed to perform a conventional load instruction that loads a single 16-bit value, a SIMD load instruction would load eight 16-bit values. SIMD processing may be referred to as vector processing. SIMD instructions provide a significant speed up over comparable conventional instructions. However, SIMD instructions may not be suitable for use with known algorithms and data structures. One example processor that supports SIMD instructions is the Pentium® microprocessor via an extension known as multimedia extension ("MMX") instructions. Another example processor that supports SIMD instructions is the PowerPC™ processor.

The term "process" may generally refer to a computer program that is currently running on a computer system. A process may include one or more threads. The term "thread" may refer to a subset of instructions of a process that perform a specific task. Threads share memory and resources of the process they are part of. Threads may work independently.

An atomic operation is an operation that appears to concurrent processes and threads running on a system to occur instantaneously. An atomic operation is guaranteed to be isolated from concurrently running processes and threads and is said to be "guaranteed" to not be interrupted by other processes and threads. An atomic operation either completes successfully or fails. During an atomic operation to read, modify and write a value at a particular memory address, other processes and threads are held off from reading, writing or operating on the address until the atomic operation successfully completes. An atomic operation may have one or more input arguments used in determining the modified value. Atomic operations may be implemented in software or in hardware.

An array is a data structure in which elements are identified by an index. A program specifies the size of an array it employs and memory for the array is allocated before its use by the program. For efficiency, an array is generally of fixed size and all elements are the same size. During runtime, if a program does not use all of the memory allocated for the array, memory is wasted. On the other hand, if the program needs a larger array at runtime than the predefined size, it's generally inefficient to expand the size of the array.

SUMMARY

Embodiments are directed to a computer-implemented method for accessing a particular element of a plurality of elements stored in an N-way linked list in a computer memory. The N-way linked list may have N linked sub-lists and a list order. Each element is in one of the N sub-lists. Each element includes a pointer to a next sequential element in a same sub-list.

An embodiment is directed to a computer-implemented method for accessing a particular element to be removed from an N-way linked list. The method includes identifying a location of the particular element. In addition, the method includes identifying respective locations of N neighbor elements consecutive to the particular element in list order. For each of the N neighbor elements, the method includes redirecting a pointer of a respective neighbor element to point to an element one position away, in list order, from an element currently pointed to by the respective neighbor element. Further, the method includes removing the particular element. The method may be employed with LIFO or FIFO N-way linked list. The method may include traversing the N sub-lists in parallel. The method may include traversing the N sub-lists using a single instruction multiple data operation.

Another embodiment is directed to a computer-implemented method for accessing a particular element of an N-way linked list, wherein the method includes adding an element to the N-way linked list. The method includes identifying a first location for adding the particular element. The first location has a first element and the first element has a pointer to a first sequential element. In addition, the method includes redirecting the pointer of the first element to point to a neighbor element one position away, in list order, from the first sequential element. Further, the method includes redirecting respective pointers of N−2 neighbor elements consecutive to the first element, in list order, to point to a neighbor element one position away, in list order, than an element currently pointed to by the respective neighbor element. Moreover, the method includes adding the particular element and redirecting a pointer of an (N−1) neighbor element consecutive to the first location, in list order, to point to the particular element. The method also includes setting the pointer of the particular element to point to the first sequential element. The method may be employed with LIFO or FIFO N-way linked list. The method may include traversing the N sub-lists in parallel. The method may include traversing the N sub-lists using a single instruction multiple data operation.

Yet another embodiment is directed to a computer-implemented method for accessing a particular element of an N-way linked. The method includes loading a first wave of N elements in parallel. The first wave includes one element from each of the N sub-lists. In addition, the method includes determining whether any element of the first wave is the particular element. Further, the method includes accessing the particular element. The method may also include loading a second wave of N elements in parallel if none of the elements in the first wave is the particular element. The second wave includes an element currently pointed to by one of the elements of the first wave. Moreover, the method may include using a single instruction multiple data operation. The accessing of the particular element may include removing the particular element or adding an element at a location one position away from a location of the particular element.

BRIEF DESCRIPTION OF THE DRAWINGS

In the Figures and the Detailed Description, like numbers may refer to like elements.

DETAILED DESCRIPTION

A variety of examples are presented in this Detailed Description. These examples may be referred to as exemplary. Note that the term "exemplary," as used in this Detailed Description, simply means an example, instance, or illustration. This term is not used to mean that a particular example is superior, commendable, or otherwise deserving of imitation over other examples.

Accessing an N-Way Linked List

An N-way linked list according to various embodiments includes elements for storing data, two or more sub-lists, and a handle. The handle may include tail elements, head elements, or both for each of the sub-lists. The handle may be an array of handles for individual sub-lists. In addition, parameters that track the number of elements added or removed from the various sub-lists may be associated with an N-way linked list. Exemplary "ITAIL" and "RTAIL" parameters for tracking the addition and removal of elements are described below.

Figure 1A:
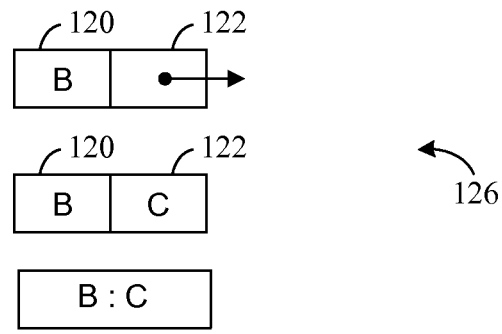
FIGS. 1A-1D show elements of an N-way linked list according to various embodiments.
Figure 1B:
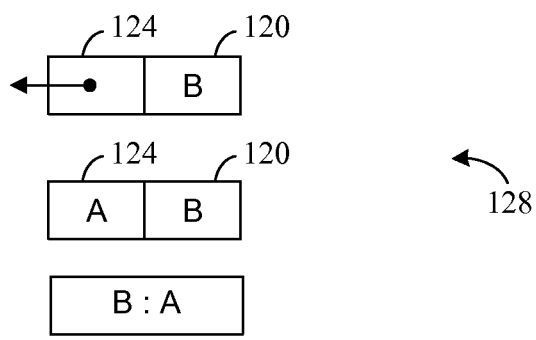
Figure 1C:
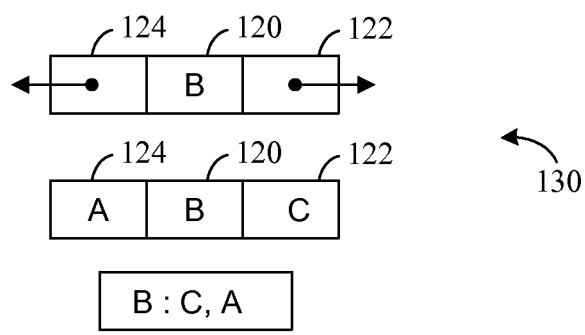

Referring to FIGS. 1A-1C, an element may include a data field 120 and a previous element pointer field 122. An element may have one or more additional data fields and one or more additional pointer fields. For example, an element may have a following element pointer field 124 in addition to or in lieu of the previous element pointer field 122. Moreover, an element may include a single pointer field that encodes both a previous and following pointer, e.g., a pointer field that requires an XOR operation to decode.

In FIG. 1A, reference number 126 points to alternative depictions of an element having a data field 120 and a previous element pointer field 122, and a notation for representing the element, i.e., "B:C." In FIG. 1B, reference number 128 points to alternative depictions of an element having a following element pointer field 124, and a notation for representing the element. In FIG. 1C, reference number 130 points to alternative depictions of an element having a following element pointer field 124 and a previous element pointer field 122, and a notation for representing the element.

Figure 1D:
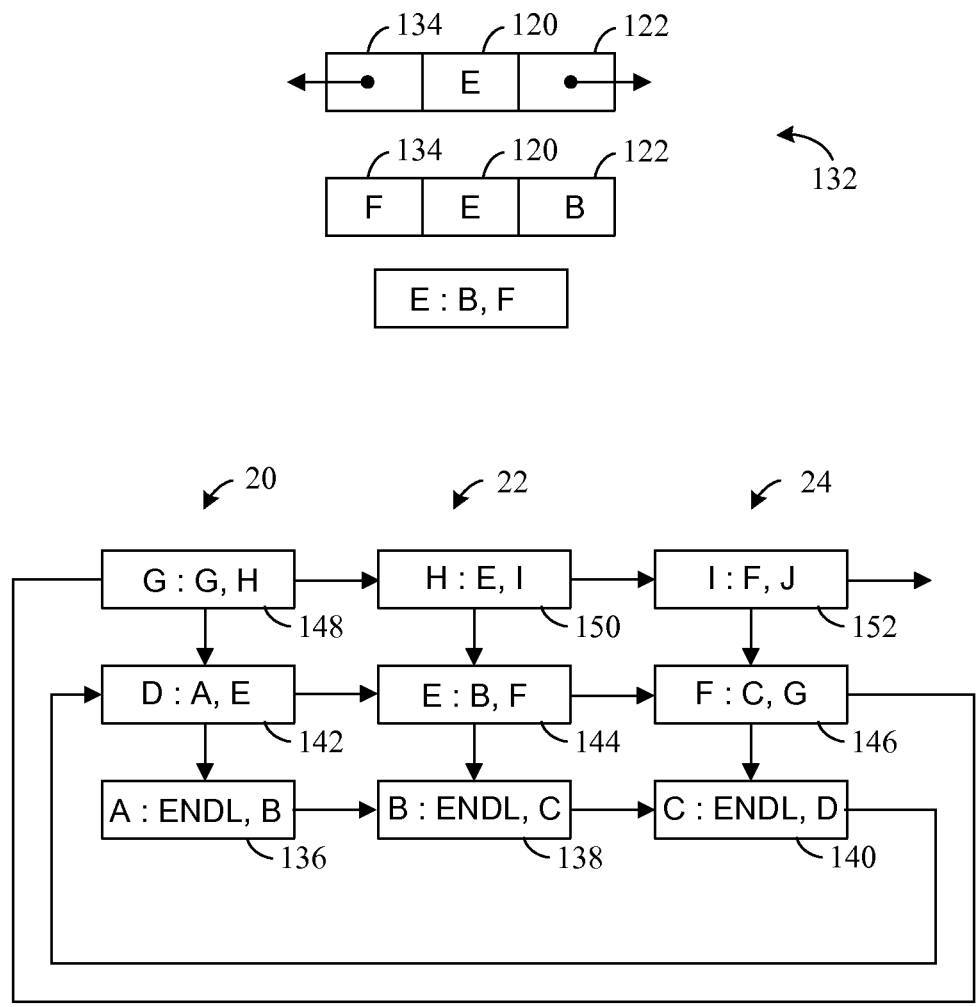

Reference number 132 in FIG. 1D points to alternative depictions of an element having a previous element pointer field 122, a sequential neighbor pointer field 134, and a notation for representing the element. FIG. 1D also depicts an N-way linked list having sub-lists 20, 22, and 24. The "list order" of the N-way linked list is A, B, C, D, E, F, G, H, I, J, (reference numbers 136, 138, 140, 142, 144, 146, 148, 150, and 152). The sequential neighbor pointer field 134 points to a next sequential element in list order. In the example shown in FIG. 1D, the sequential neighbor pointer field 134 points to a next following element in list order. The previous element pointer field 122 points to next sequential element in a sub-list in a sub-list order. In the example shown in FIG. 1D, the previous element pointer field 122 points to next previous element in a sub-list. For example, the sequential neighbor pointer field 134 of element E points to F, which is a next following element list order, and the previous element pointer field 122 of element E points to B, which is a next previous element in sub-list 22.

Figure 2:
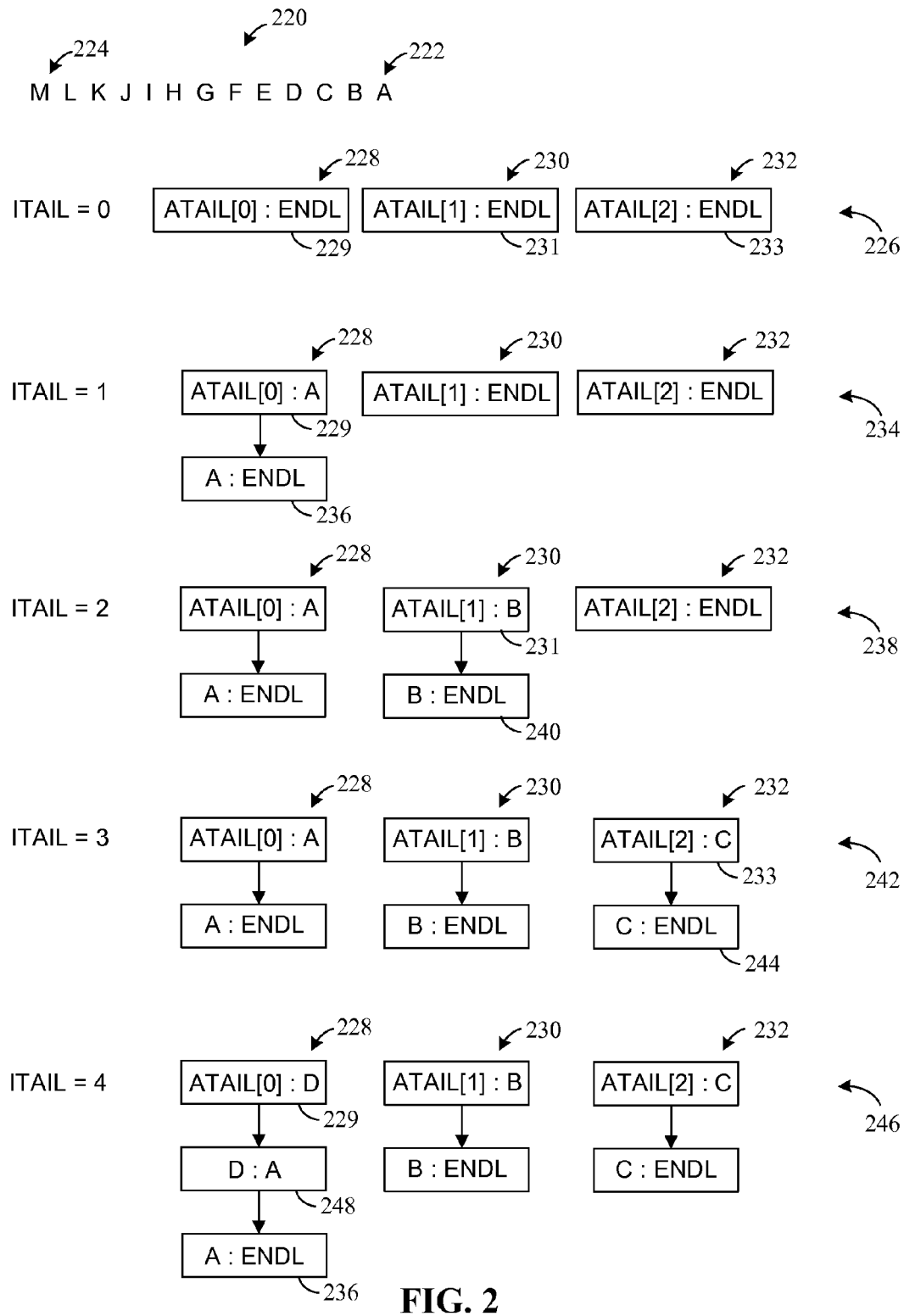
FIG. 2 shows example data and an exemplary LIFO N-way linked list at various stages after elements of the example data have been added to the list according to various embodiments.

FIG. 2 shows example data 220 used in N-way list linked examples presented in this Detailed Description. The example data is shown sequentially arranged in a "list order." The list order includes a first data element 222 and a last data element 224. The list order may correspond to the order in which data is initially stored in an N-way linked list. In addition, the list order may correspond to an order of the data stored in an N-way linked list after the addition or removal of one or more data elements. Various embodiments presented in this Detailed Description provide for the addition or removal of an element from an N-way linked list in a manner that preserves a "list order" of the data stored in the list.

According to various embodiments, an N-way linked list includes two or more sub-lists. Each sub-list has a respective sub-list order. Each sub-list order is sequential and includes head and tail elements. The list order and the respective sub-list orders are different from one another. In other words, there is a head, a tail, and a list order for an N-way linked list and there are heads, tails, and sub-list orders for each of the N sub-lists. According to various embodiments, an operation may remove or add an element to an N-way linked list in a manner that preserves the list order, because the operation moves elements between sub-lists and thus may modify a sub-list order.

Figure 3:
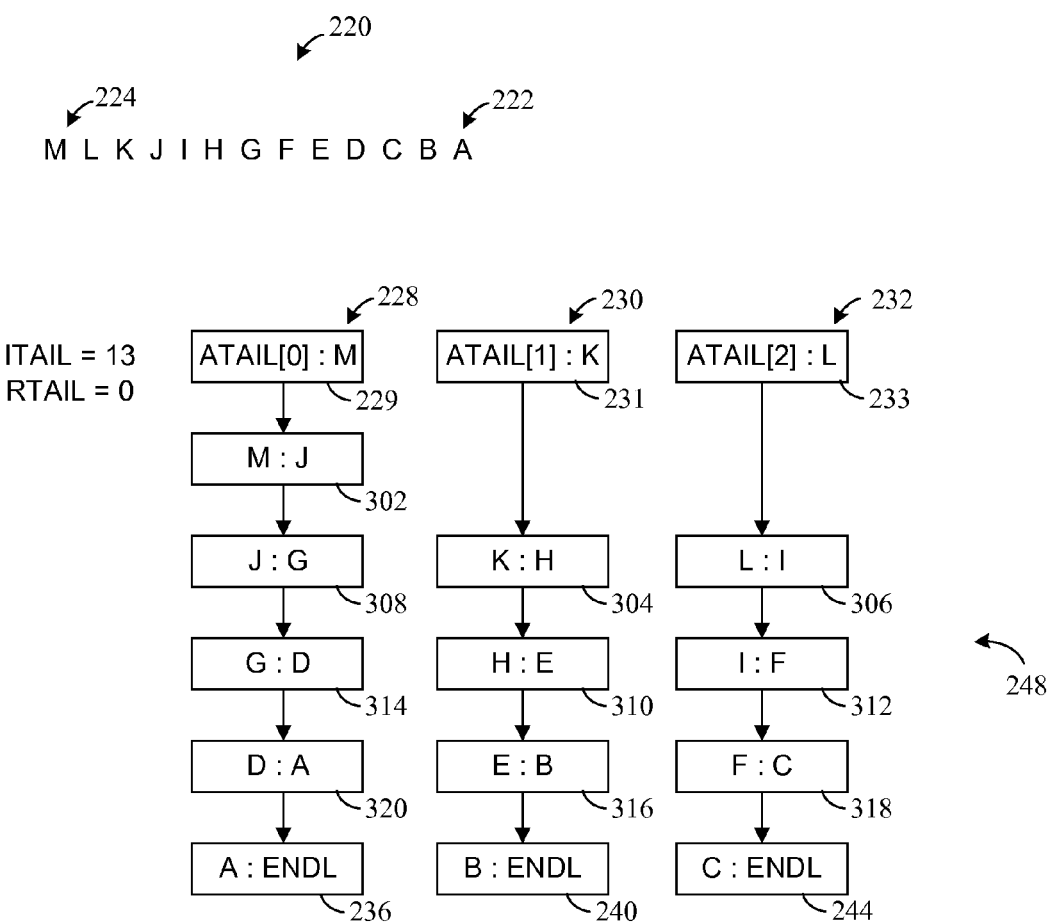
FIG. 3 shows the example data and exemplary N-way LIFO linked list of FIG. 2 after all of the example data has been added to the list according to various embodiments.

FIGS. 2 and 3 show an example of an exemplary N-way linked list according to various embodiments. In the example shown in FIGS. 2 and 3, N equals three. Reference number 226 points to an N-way linked list that includes three linked sub-lists 228, 230, and 232. The N-way linked list designated by reference number 226 is an empty list. The sub-lists 228, 230, and 232 of the N-way linked list 226 respectively include sub-list tail elements 229, 231, and 233. The exemplary list tail elements have two fields. A first field identifies the sub-list, e.g., ATAIL[0] identifies sub-list 228. A second field identifies a previous element. The list tail elements are part of the handle and may not store data. Because the N-way linked list designated by reference number 226 is an empty list, each of the list tail elements includes an end of list identifier ENDL in the second field.

The exemplary N-way linked list shown in FIGS. 2-3 may be used as a last-in first-out "stack." Data elements may be either "pushed" onto or "popped" off the list at the tail of the N-way linked list, i.e., at the element pointed to by the list tail element that points to the tail of the list (in list order). While each of the sub-list tail elements 229, 231, and 233 points to a tail of a sub-list, only one of the sub-list tail elements points to the tail of the list. Pushing or popping data off the N-way linked list changes the sub-list that holds the tail of list.

A parameter ITAIL may be associated with an N-way linked list in various embodiments. In one embodiment, e.g., when the N-way linked list is used as a last-in first-out (LIFO) "stack," the parameter ITAIL may specify the number of data elements stored in the N-way linked list. When used with a LIFO, ITAIL may be incremented or decremented each time an element is added or removed. In another embodiment, e.g., when the N-way linked list is used as a first-in first-out (FIFO) "producer-consumer" structure, the parameter ITAIL may specify the number of data elements added to the N-way linked list. When used with a FIFO, ITAIL may be incremented each time an element is added. A parameter RTAIL may be associated with an N-way linked list in various embodiments. RTAIL may specify the number of data elements removed from the N-way linked list. When RTAIL is associated with a LIFO N-way linked list, ITAIL may be incremented each time an element is added and RTAIL incremented each time an element is removed. Because the N-way linked list designated by reference number 226 is an empty list, ITAIL equals zero.

As may be seen in FIG. 2, reference number 234 points to the exemplary N-way linked list after a first data element A of example data 220 has been pushed onto the list. The data element A is mapped to a particular one of the sub-lists 228, 230, or 232 according to the sequential position of the data element A in the list order. In particular, the data element A is mapped to the first sub-list 228 because A is in the first sequential position in the list order. An element 236 that contains A is added to the first sub-list 228. Because this element 236 is the first element in the first sub-list, an end of list identifier ENDL in placed in the next element pointer field. In addition, the previous element pointer of list tail element 229 is updated to point to the element 236 that contains A. Because one element was added to the N-way linked list, ITAIL is updated to equal one.

Reference number 238 points to the exemplary N-way linked list after a next sequential data element B of example data 220 has been added to the list. The data element B is mapped to a particular one of the sub-lists according to its sequential position in the list order, i.e., the data element B is mapped to the second sub-list 230 because B is in the second sequential position in the list order. An element 240 that contains B is added to the second sub-list 230. Because this element 240 is the first element in the second sub-list, an end of list identifier ENDL is placed in the previous element pointer field. In addition, the next element pointer of list tail element 231 is updated to point to the element 240 that contains B. Because two elements have been added to the N-way linked list, ITAIL is updated to now equal two.

Reference number 242 points to the exemplary N-way linked list after a next sequential data element C of example data 220 has been added to the list. The data element C is mapped to a particular one of the sub-lists according to its sequential position in the list order, i.e., the data element C is mapped to the third sub-list 232 because C is in the third sequential position in the list order. An element 244 that contains C is added to the third sub-list 232. Because this element 244 is the first element in the third sub-list, an end of list identifier ENDL is placed in the previous element pointer field. In addition, the next element pointer of list tail element 233 is updated to point to the element 244 that contains C. Because three elements have been added to the N-way linked list, ITAIL is updated to now equal three.

Reference number 246 points to the exemplary N-way linked list after a next sequential data element D of example data 220 has been added to the list. The data element D is mapped to a particular one of the sub-lists according to its sequential position in the list order, i.e., the data element D is mapped to the first sub-list 228 because D is in the fourth sequential position in the list order. An element 248 that contains D is added to the first sub-list 228. The element 248 includes a previous element pointer field having a pointer to the element 236 that contains data element A. The next element pointer of list tail element 229 is updated to point to the element 248 that contains D. Because four elements have been added to the N-way linked list, ITAIL is updated to now equal four.

Referring now to FIG. 3, reference number 248 points to the exemplary LIFO N-way linked list after all of the data of example data 220 have been added to or pushed onto the N-way linked list. For reference purposes, FIG. 3 also shows the example data 220. Because thirteen elements have been added to the N-way linked list, ITAIL is updated to now equal thirteen. In FIG. 3, RTAIL equals zero as no elements have been removed from the list.

FIG. 3 illustrates a plurality of elements stored in an N-way linked list. The N-way linked list may be in a computer memory. The N-way linked list has N linked sub-lists and a list order. Each element is in one of the N sub-lists. Each element includes a pointer that points to a next sequential element in a same sub-list. In FIG. 3, the next sequential elements are previous elements in a same sub-list.

FIG. 3 illustrates that the elements are arranged in list order in stripes across the sub-lists. For example, the first three data elements A, B, C (236, 240, 244) form a first stripe; the second three data elements D, E, F (320, 316, 318) form a second stripe; the third three data elements G, H, I (314, 310, 312) form a third stripe, and so on. In list order, data element D, 320 is previous to data element E, 316. In list order, data element F, 318 follows data element E, 316. In list order, D, E, and F are consecutive elements. In list order, the data element that is previous to an element in a particular sub-list is found in an adjacent sub-list. In list order, the data element that follows an element in a particular sub-list is found in an adjacent sub-list. An adjacent sub-list includes a sub-list that wraps to the other side other the N-way linked list, e.g., data element I, 312 in sub-list 232 is adjacent to data element J, 308 in sub-list 228. The data element I is previous to data element J in list order.

FIG. 3 also illustrates that each sub-list 228, 230, and 232 has a respective sub-list order. Elements A, D, G, J, and M are sequentially ordered in sub-list 228. Elements B, E, H, and K are sequentially ordered in sub-list 230. Elements C, F, I, and L are sequentially ordered in sub-list 232. In sub-list order, data element B, 240 is previous to data element E, 316. In sub-list order, data element H, 310 follows data element E, 316. In sub-list order, the data element that is previous to an element in a particular sub-list is found in the same sub-list, not in an adjacent sub-list. In sub-list order, the data element that follows an element in a particular sub-list is found in the same sub-list, not in an adjacent sub-list.

An N-way linked list may be accessed using its handle. For the N-way linked list shown in FIG. 3, there are three sub-list handles, one for each linked sub-list. The sub-list handles include the tail list elements 229, 231, and 233. In addition, an N-way linked list handle may include the parameters ITAIL and RTAIL, and list head elements in various embodiments. In FIG. 3, the sub-list handles identify the tails of the respective sub-lists. The tail of the N-way linked list, according to its list order, is data element M, 302.

The tail of the LIFO N-way linked list, e.g., data element M, 302, may be found using the parameters ITAIL and RTAIL. ITAIL and RTAIL are added and one subtracted from their sum: (ITAIL+RTAIL−1). The sum is divided by N. The remainder after the division gives the sub-list having the tail of the N-way linked list. For the N-way linked list shown in FIG. 3, (13+0−1)=12. The sum of 12 is divided by N=3. The remainder after the division is zero (0). Thus, the sub-list pointed to by ATAIL[0] points to the tail of the N-way linked list according to the list order. The number of elements in a LIFO N-way linked list (or the number of elements in a sub-list) may be found using the parameters ITAIL and RTAIL: ITAIL−RTAIL=number of elements.

Figure 4:
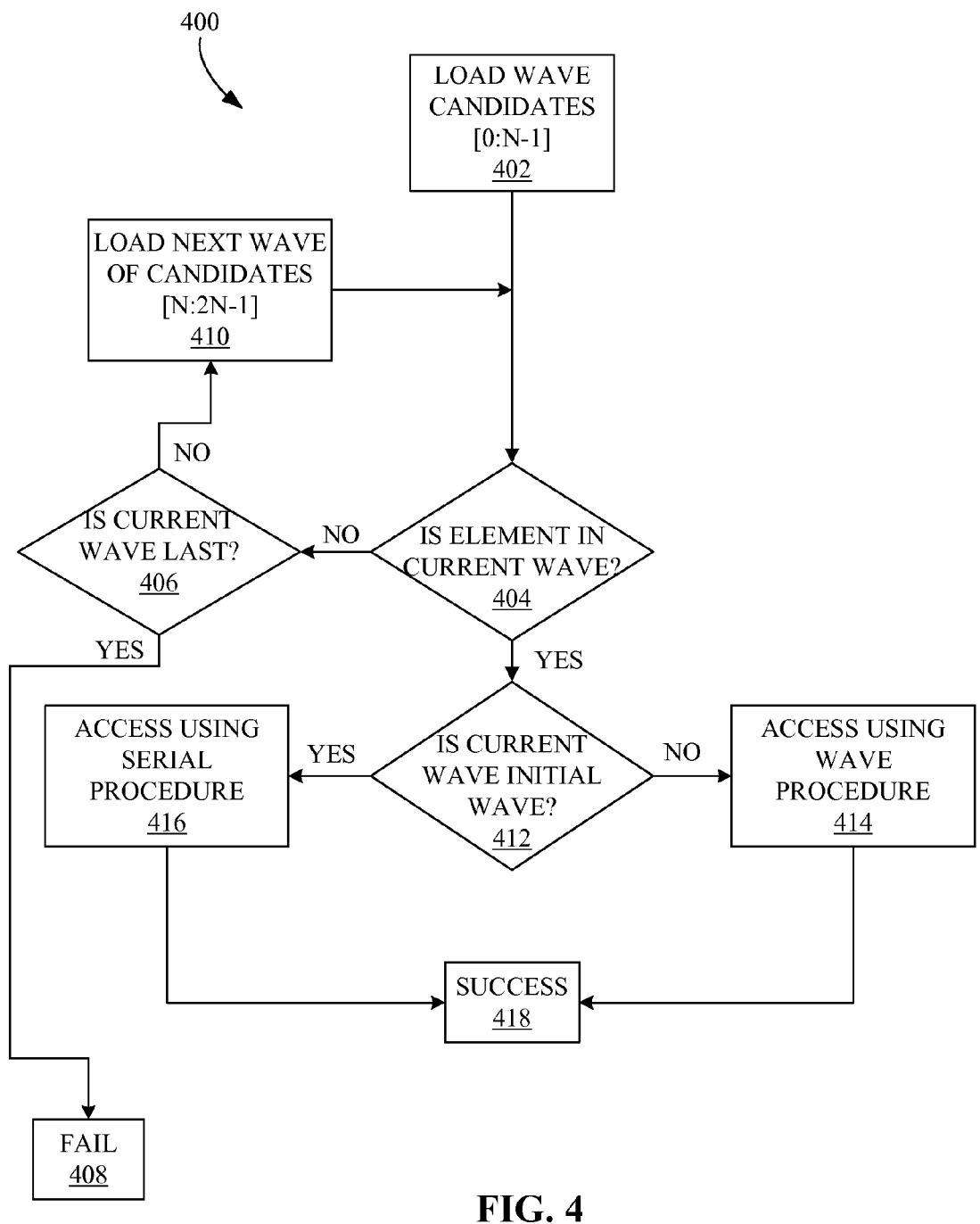
FIG. 4 is a flow diagram of a process for accessing a particular element stored in an N-way linked list in a computer memory according to various embodiments.

FIG. 4 is a flow diagram of an exemplary process 400 for accessing a particular element "R" of a plurality of elements stored in an N-way linked list in a computer memory according to various embodiments. In operation 402, a first "wave" of N candidates is loaded from memory. In various embodiments, waves of N elements may be loaded in parallel. Waves may include one element from each of the N sub-lists. The first wave may include the tail elements of each of the N lists, e.g., if the list is of the LIFO type. The first wave may include the head elements of each of the N lists, e.g., if the list is of the FIFO type. The locations or addresses of the first wave may be determined from the handle for the N-way linked list. Referring to the example of FIG. 3, the first wave of candidates includes the elements pointed to by the tail list elements 229, 231, and 233, i.e., ATAIL [0, 1, N−1=2]. The first wave of candidates includes elements M, K, and L (reference numbers 302, 304, and 306).

In operation 404, the current wave of candidates is inspected to determine whether the particular element R is one of the candidates. (In an initial iteration, the first wave is the current wave. A subsequent wave includes elements pointed to by elements of the current wave, e.g., for a LIFO type list, the previous elements of the elements of the current wave.) If the current wave of candidates does not include the particular element R, it is determined in operation 406 whether the current wave is the last wave. If the current wave is the last wave, the access operation fails in operation 408. Otherwise, in operation 410, a next wave of candidates is loaded in operation 410. The next wave becomes the current wave and the process moves back to operation 404.

In operation 404, the current wave of candidates is inspected to determine whether the particular element R is one of the candidates. The element R may be an element that is to be read, modified, or removed as part of the access operation. In addition, element R may be an element that will follow or precede a new element to be added to the list.

The next wave of candidates is loaded in operation 410. Operation 410 may include loading the respective previous elements of each element of the current wave, e.g., if the list of the LIFO type. For example, if the current wave includes the elements M, K, and L (reference numbers 302, 304, and 306), the next wave will have the elements [N=3, 1, 2*N−1=2], e.g., J, H, and I (reference numbers 308, 310, and 312). The elements J, H, and I are the respective previous elements of the elements M, K, and L. In addition, the operation 410 may include loading the respective following elements of each element of the current wave, e.g., if the list of the FIFO type. The operation 410 may include multiple load operations. In various embodiments, the multiple loads in parallel.

If it is determined in operation 404 that the current wave of candidates includes the particular element R, it may be determined in operation 412 whether the current wave is the initial wave. If the list is traversed from the tail, the tail wave may be the initial wave. If the list is traversed from the head, the head wave may be the initial wave. In the example of FIG. 3, the initial wave is the tail wave, which is the last N elements of the N-Way linked list, e.g., elements M, K, and L. If the current wave is not the initial wave, the process moves from operation 412 to operation 414. If the current wave is the initial wave, the process moves from operation 412 to operation 416.

If the access is a read access, the operations 414 and 416 include reading the element. If the access is a write access, the operations 414 and 416 include writing data to the element. If the access removes or adds an element to the list, operations 414 and 416 may vary according to the type of access. Removing and adding elements from the list are further described below. After operations 414 and 416, the process moves to operation 418, indicating that the process was successful.

If the current wave is the initial wave and the access includes removing or adding an element to the list, the operation may be performed using a serial procedure (operation 416). For a removal, each element in the wave is serially examined to determine whether it is the element to be removed. For a removal, when the element is found, it is removed and a pointer in a tail or head element in the handle is modified. For an addition, when the element is found, each element in the wave may be serially examined to determine whether it is an element that will first precede the inserted element after it is inserted. Alternatively, for an addition, when the element is found, each element in the wave may be serially examined to determine whether it is an element that will first follow the inserted element after it is inserted. When the element is found, it is added and a pointer in a tail or head element in the handle is modified. In addition, a pointer in the added element is modified to point to the element previously pointed to by the tail or head element.

Figure 5:
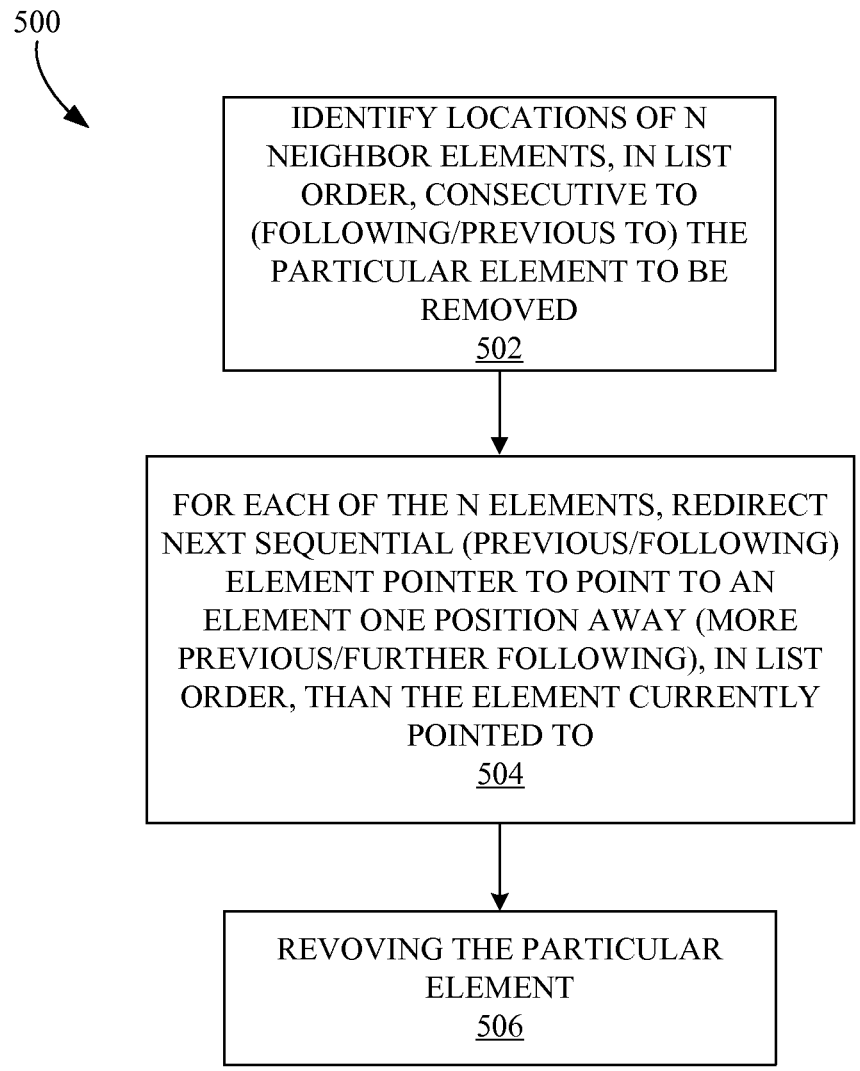
FIG. 5 is a flow diagram of a process for removing a particular element stored in an N-way linked list in a computer memory according to various embodiments.

FIG. 5 is a flow diagram of an exemplary process 500 for removing a particular element "R" of a plurality of elements stored in an N-way linked list in a computer memory according to various embodiments. The operation 414 of process 400 may include the process 500. The process 500 will be first described with respect to LIFO type list. In operation 502, the respective locations of N neighbor elements consecutive to (e.g., following for a LIFO type list), in list order, the particular element to be removed may be identified. In operation 504, for each of the identified N neighbor elements, a next sequential element pointer (e.g., a previous element pointer for a LIFO type list) of the respective neighbor element may be redirected to point to an element one position away (e.g., more previous for a LIFO type list), in list order, than an element currently pointed to by the respective neighbor element. In operation 506, the particular element may be removed.

Figure 6A:
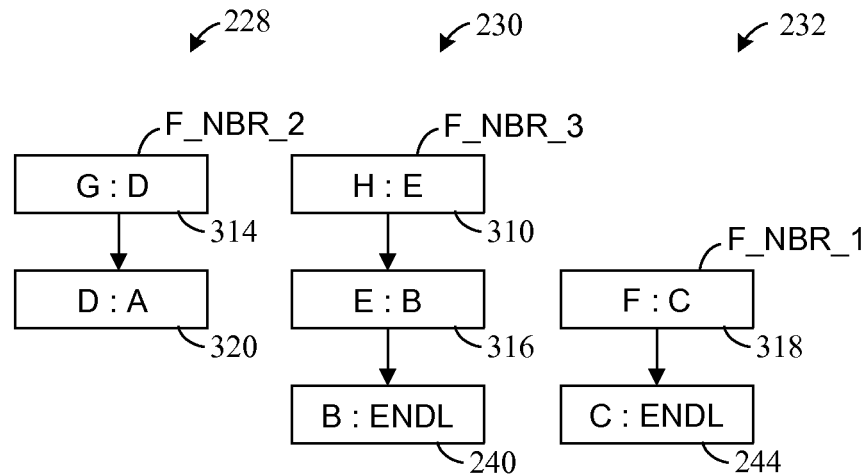
FIGS. 6A and 6B illustrate neighbor elements of a particular element and portions of the sub-lists of FIG. 3 and FIG. 8, respectively, according to various embodiments.

The exemplary process 500 refers to "neighbor" elements. FIG. 6A depicts one example of neighbor elements of an element R for a LIFO type N-way linked list. FIG. 6A illustrates portions of the sub-lists 228, 230, and 232. In FIG. 6A, it is assumed that the particular element R is element E, 316. Element H, 310 is the 3rd following, in list order, neighbor element (F_NBR_3) of element E. Element G, 314 is 2nd following, in list order, neighbor element (F_NBR_2) of element E. Element F, 318 is 1st following, in list order, neighbor element (F_NBR_1) of element E.

As an example of the operation 504 for LIFO type list, referring to FIG. 6A, let N=3 and R=E, then in, the previous element pointer of the $N^{th}$ neighbor element (H) of element R (E) is redirected to point to the previous element of the $(N-1)^{th}$ neighbor element (G) of element R. Since the previous element of G is D, 320, the previous element pointer of H is redirected to point from element E, 316 to element D, 320, which is a more previous element than the element currently pointed to by H.

If the N-way linked list is of the FIFO type, in operation 502, the respective locations of N neighbor elements consecutive to (e.g., previous to for a FIFO type list), in list order, the particular element to be removed may be identified. In operation 504, for each of the identified N neighbor elements, a next sequential element pointer (e.g., a following element pointer for a FIFO type list) of the respective neighbor element may be redirected to point to an element one position away (e.g., further following for a FIFO type list), in list order, than an element currently pointed to by the respective neighbor element. In operation 506, the particular element may be removed.

Figure 6B:
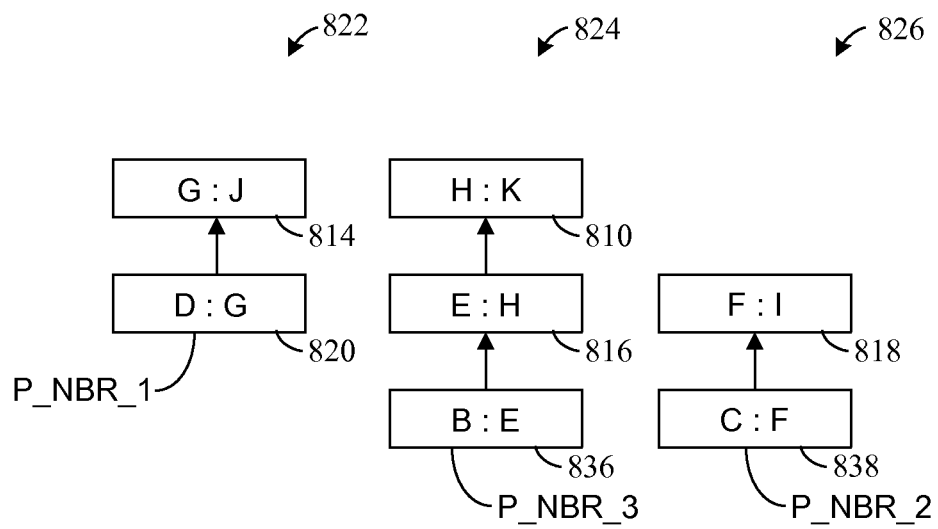

FIG. 6B depicts a second example of neighbor elements of an element R for a FIFO type N-way linked list. FIG. 6B illustrates portions of sub-lists 822, 824, and 826 (further described below with respect to FIG. 8). Element B, 836 is 3rd previous neighbor element (P_NBR_3) of element E. Element C, 838 is 2nd previous neighbor element (P_NBR_2) of element E. Element D, 820 is 1st previous neighbor element (P_NBR_1) of element E.

As an example of the operation 504 for FIFO type list, referring to FIG. 6B, let N=3 and R=E, then in, the following element pointer of the $N^{th}$ neighbor element (B) of element R (E) is redirected to point to the following element of the $(N-1)^{th}$ neighbor element (C) of element R. Since the following element of C is F, 818, the following element pointer of B is redirected to point from element E, 816 to element F, 818, which is an element further following the element currently pointed to by B.

Figure 7:
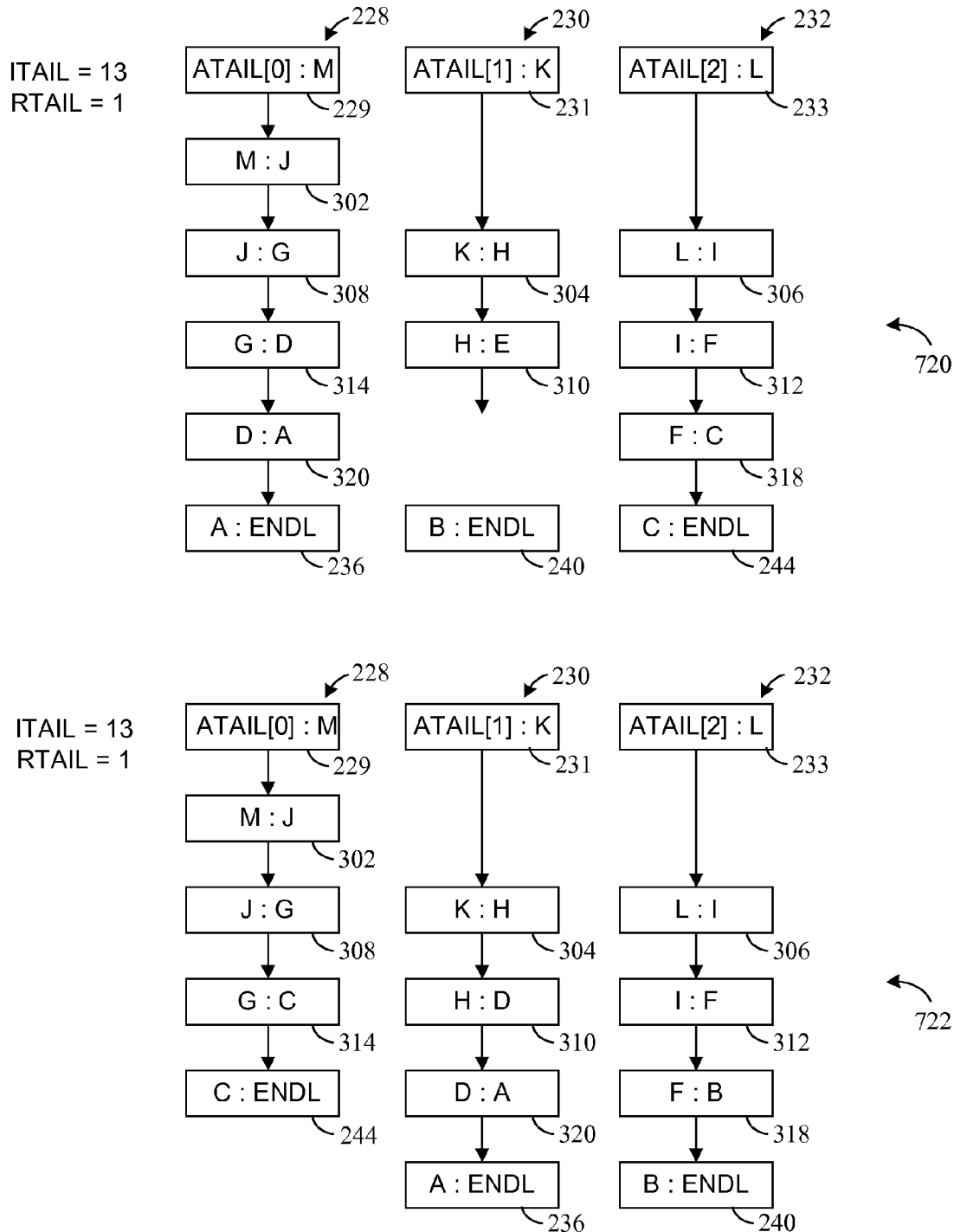
FIG. 7 illustrates an example of removing a particular element from a LIFO N-way linked list.

FIG. 7 illustrates an example of removing a particular element, e.g., element 316, from a LIFO N-way linked list. FIG. 3 shows the N-way linked list before removal of the element 316 storing E. Reference number 720 points to the N-way linked list in which the element 316 that contains E has been removed, but previous element pointers have not been redirected. Reference number 722 points to an N-way linked list in which the pointers of the N elements immediately adjacent, in list order, to the element 316 that contains E have been redirected.

In the example of FIG. 7, the N elements immediately adjacent and following, in list order, the removed element 316 are the elements that contain H, G, and F, i.e., elements 310, 314, and 318. In an exemplary element removal operation, the previous element pointer of element 310 (H) is redirected to point from element 316 (E) to element 320 (D), the previous element pointer of element 314 (G) is redirected to point from element 320 (D) to element 244 (C), and the previous element pointer of element 318 (F) is redirected to point from element 244 (C) to element 240 (B).

The example of FIG. 7 illustrates that a particular element may be removed from the N-way linked list and the order of the remaining list is preserved, which may be an advantage. Moreover, removing an element only requires changing three link elements (F, G, and H), which may also be an advantage. In the example shown in FIG. 7, RTAIL would be incremented to one as one data element was removed. Use of the parameter RTAIL avoids the need to change ATAIL when removing a data element, which may be an advantage. Another feature of an N-way-linked list according to various embodiments is that the time to push or pop an element to the list does not change from that required for a conventional linked list. Similarly, functions and methods used with a conventional linked list may be used with an N-way-linked list according to various embodiments. Another feature of an N-way-linked list according to various embodiments, that may be an advantage, is that the address of the N-way-linked list handle is static. In contrast, the address of the handle to a conventional linked list changes after each push or pop.

Figure 8:
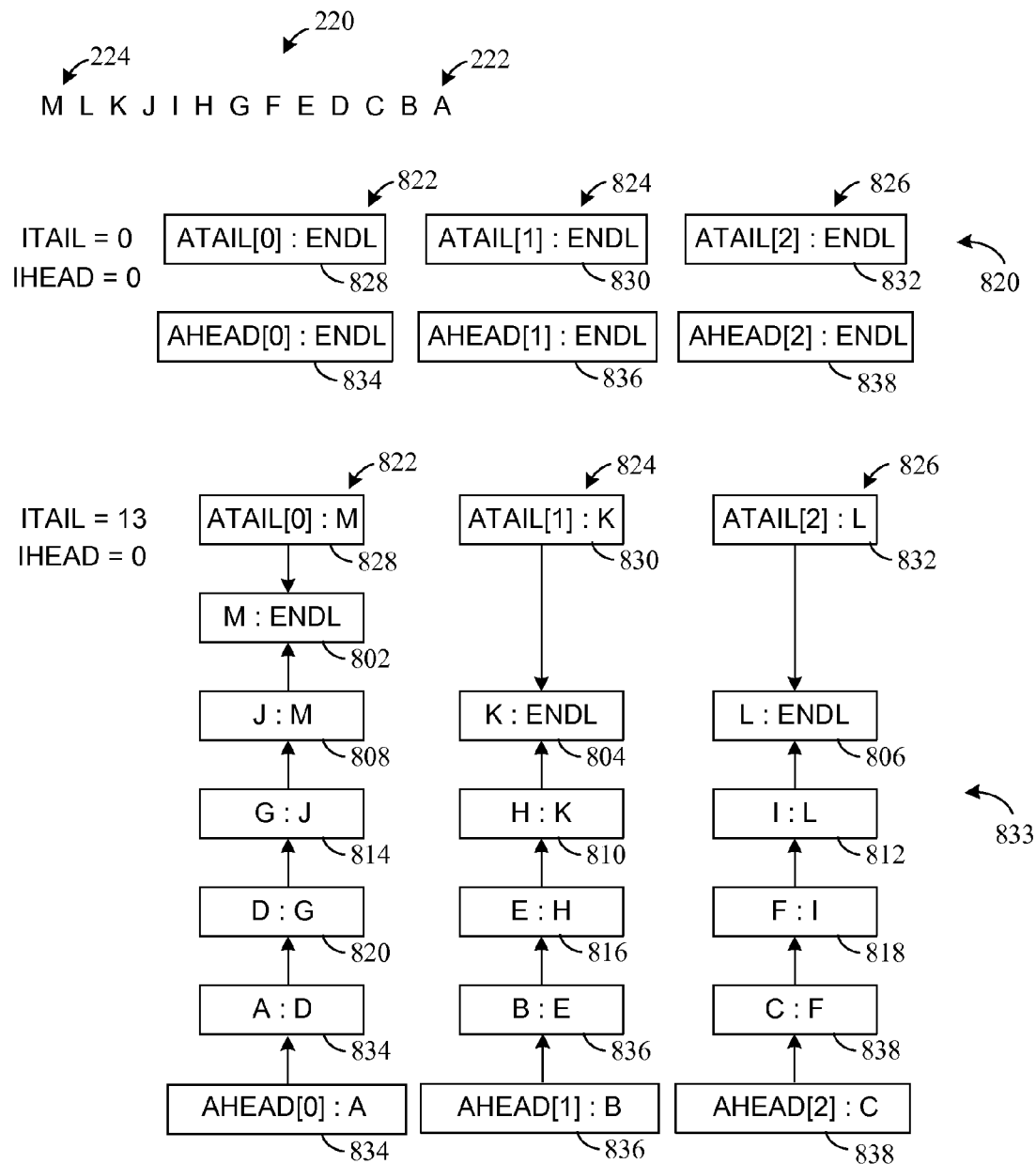
FIG. 8 shows an exemplary FIFO N-way linked list according to various embodiments.

FIG. 8 shows an exemplary N-way linked list that may be used as a first-in first-out, producer-consumer structure according to various embodiments. For reference purposes, FIG. 8 also shows the example data 220. In FIG. 8, N equals three for the N-way linked list. Reference number 820 points to an N-way linked list that includes three linked sub-lists 822, 824, and 826. The N-way linked list designated by reference number 820 is an empty list. The sub-lists 822, 824, and 826 respectively include list tail elements 828, 830, and 832. In addition, the sub-lists 822, 824, and 826 respectively include list head elements 834, 836, and 838. The exemplary list head and tail elements have two fields. The list head elements include a first field that identifies the sub-list, e.g., AHEAD[0] identifies sub-list 822, and a second field that identifies a following element. The list tail elements include a first field that identifies the sub-list and second field with the ENDL identifier. Because the N-way linked list 820 is an empty list, each of the list head elements includes an end of list identifier ENDL in their respective second fields.

Data elements may be pushed onto the N-way linked list depicted in FIG. 8 at the tail of the list and popped off the list at the head of the list. Popping data of the head of the list changes the sub-list that holds the head of the list. As mentioned, an N-way linked list may be accessed using its handle. For the N-way linked list shown in FIG. 8, there are six sub-list handles, one for each linked sub-list. The sub-list handles are the list head elements 834, 836, and 838, and the list tail elements 828, 830, and 832. The sub-list handles identify the heads and tails of the respective sub-lists. Reference number 833 points to the exemplary N-way linked list after all of the data elements of example data 220 have been pushed in list order onto the N-way linked list. The head and tail of the N-way linked list, according to its list order, are data elements A, 834 and M, 802, respectively.

The parameters ITAIL and RTAIL may be associated with the N-way linked list depicted in FIG. 8. The parameter RTAIL may specify the number of data elements removed the N-way linked list. The parameter RTAIL may be incremented each time a data element is removed from the list. In FIG. 8, the parameter ITAIL may specify the number of data elements added to the N-way linked list.

FIG. 8 illustrates a plurality of elements stored in an N-way linked list. The N-way linked list may be in a computer memory. The N-way linked list has N linked sub-lists and a list order. Each element is in one of the N sub-lists. Each element includes a pointer that points to a next sequential element in a same sub-list. In FIG. 8, the next sequential elements are following elements in a same sub-list.

In FIG. 8, reference number 833 points to the exemplary N-way linked list after all of the data elements of example data 220 have been pushed in list order onto the N-way linked list. Like the N-way list depicted in FIGS. 2-3, the first N data elements of example data 220 are mapped to each of the respective N sub-lists depicted in FIG. 8 corresponding with the sequential position of the data element in the list order of the example data 220. FIG. 8 illustrates how repeatedly mapping the individual data elements of each group of N elements sequentially into successive sub-lists results in a "striped" arrangement of data across the sub-lists. For example, the data elements A, B, C form a first stripe, the data elements D, E, F form a second stripe, and so on.

The FIFO N-way linked list depicted in FIG. 8 differs from the LIFO N-way linked list depicted in FIGS. 2-3 in that the former includes previous element pointers and the latter includes following element pointers that point in the direction of list tail elements.

Figure 9:
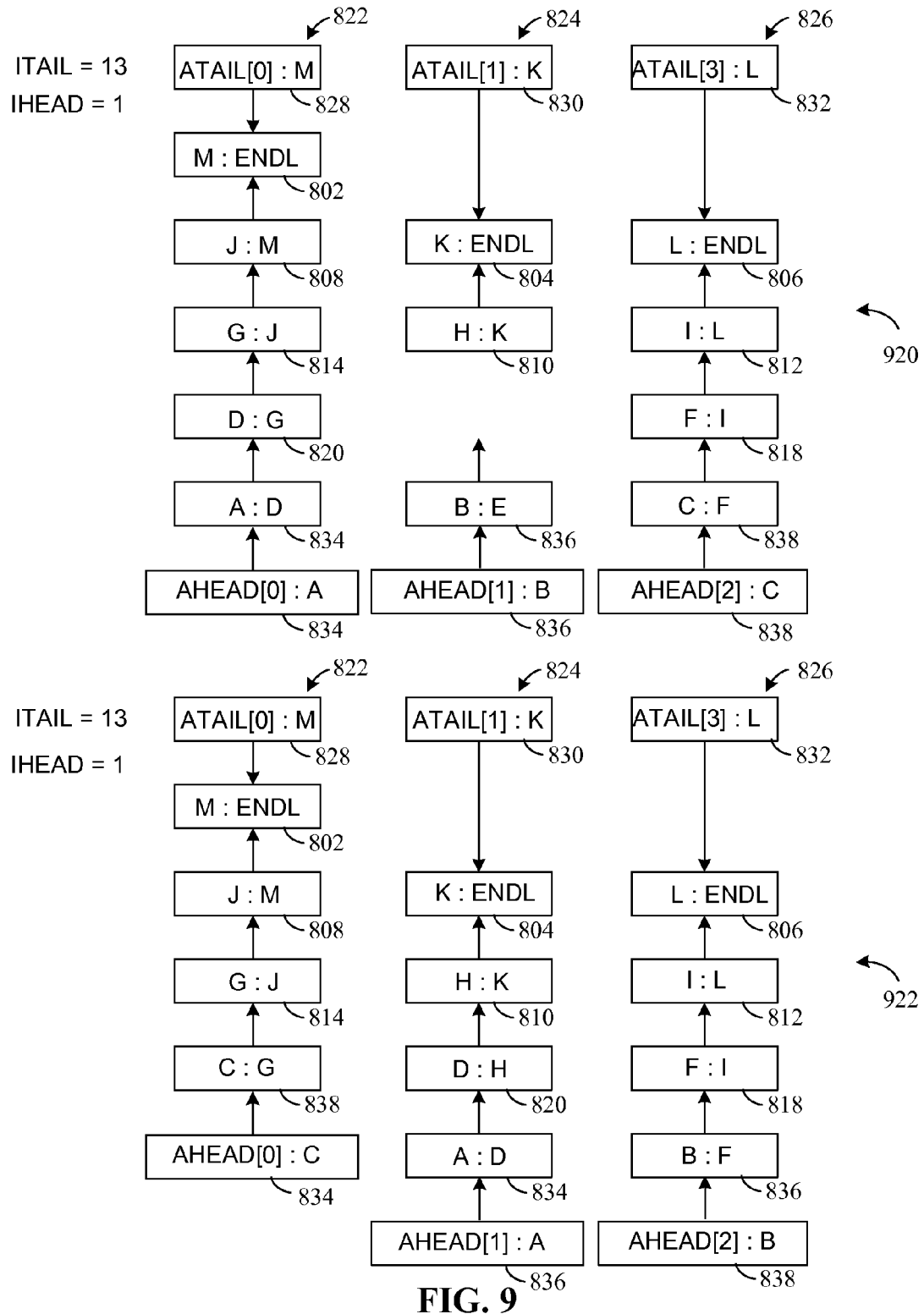
FIG. 9 illustrates an example of removing an element from a FIFO N-way linked list according to various embodiments.

FIG. 9 illustrates an example of removing a particular element, e.g., element 816, from a FIFO N-way linked list. FIG. 8 shows the FIFO N-way linked list before removal of the element 816 storing E. Reference number 920 points to the N-way linked list in which the element 816 that contains E has been removed, but following element pointers have not been redirected. Reference number 922 points to an N-way linked list in which the pointers of the N elements consecutive in list order to the element 816 that contains E have been redirected.

In the example of FIG. 9, the N elements consecutive and previous to, in list order, the removed element 316 are the elements B, 836, C, 838, and D, 820. In an exemplary element removal operation, the following element pointer of element 836 (B) is redirected to point from element 816 (E) to element 818 (F), the following element pointer of element 838 (C) is redirected to point from element 918 (F) to element 914 (G), and the following element pointer of element 820 (D) is redirected to point from element 914 (G) to element 910 (H). The parameter RTAIL may be incremented as one data element is removed from the list.

Figure 10:
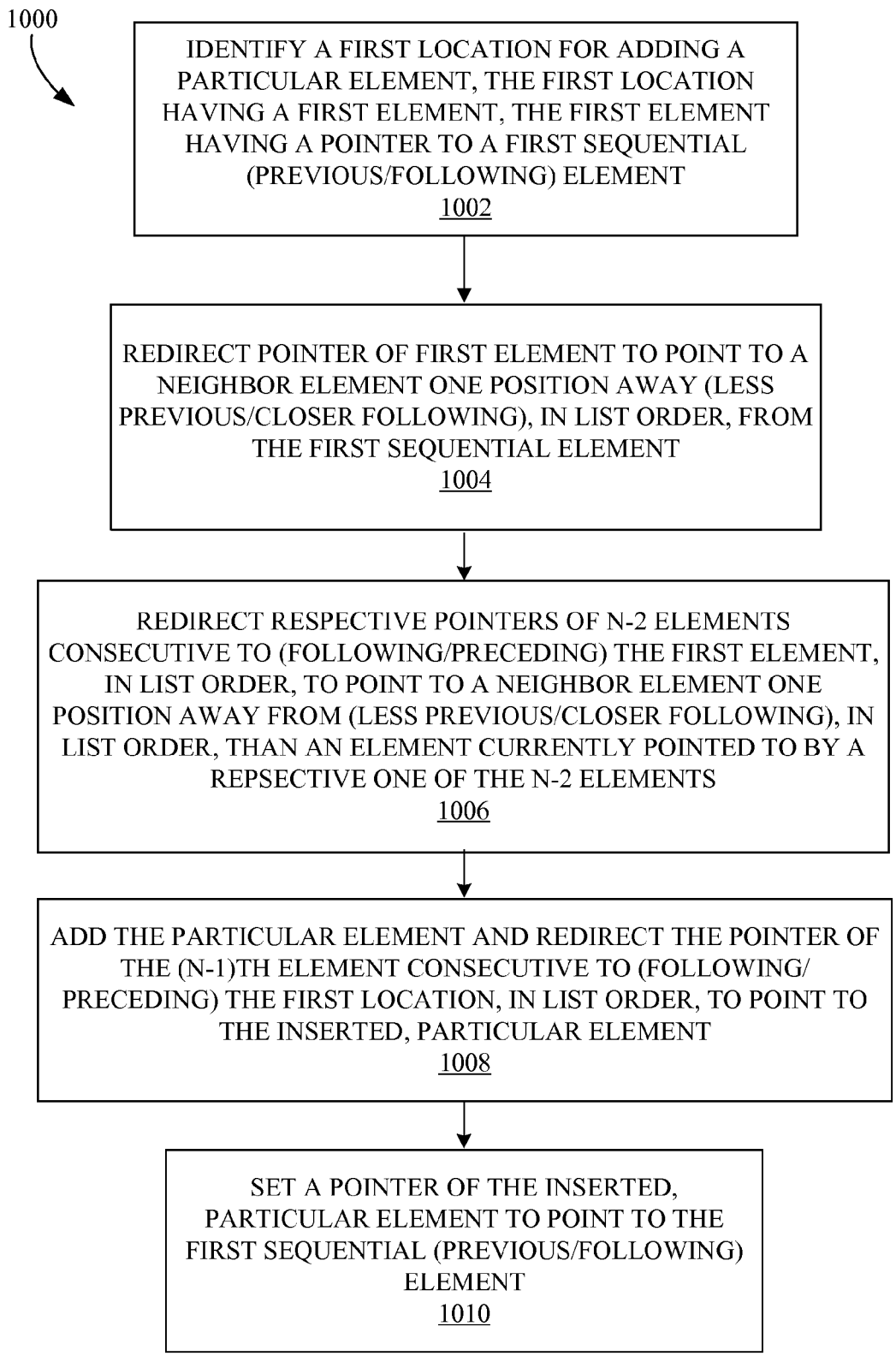
FIG. 10 is a flow diagram of a process for adding a particular element to in an N-way linked list in a computer memory according to various embodiments.

FIG. 10 is a flow diagram of an exemplary process 1000 for adding a particular element "A" to a plurality of elements stored in an N-way linked list in a computer memory according to various embodiments. The operation 414 of process 400 may include the process 1000.

In operation 1002, a first location for adding the particular element "S" is identified. The location may have a first element. The first element may have a pointer to a first sequential element. The first sequential element may be a first previous element if the list is of the LIFO type. The first sequential element may be a first following element if the list is of the FIFO type. In the case of a LIFO type list, the location may be a location that will, after adding the element S, be a location that will first follow, in list order, the inserted element S after it is added to list. If the list is of the FIFO type, the location may be a location that will, after adding the element S, be a location that will first precede, in list order, the inserted element S after it is added to the list. This location may be referred to, for convenience, as a "first" location.

In operation 1004, the pointer of the first element may be redirected to point to a neighbor element one position away, in list order, from the first sequential element. If the list is of the LIFO type, the pointer of the first element may be redirected to point to a neighbor element one position less previous, in list order, than a neighbor element currently pointed to by the first previous element. If the list is of the FIFO type, the pointer of the first element may be redirected to point to a neighbor element one position closer following, in list order, than a neighbor element currently pointed to by the first previous element.

In operation 1006, for each of the N−2 neighbor elements consecutive to the first location, in list order, the respective pointers of the N−2 neighbor elements are redirected to point to a neighbor element one position away, in list order, than an element currently pointed to by each respective one of the N−2 elements. If the list is of the LIFO type, then for each of the N−2 neighbor elements consecutively following the first location, in list order, the respective pointers of the N−2 neighbor elements are redirected to point to a neighbor element one position less previous, in list order, than an element currently pointed to by each respective one of the N−2 elements. If the list is of the FIFO type, then for each of the N−2 neighbor elements consecutively preceding the first location, in list order, the respective pointers of the N−2 neighbor elements are redirected to point to a neighbor element one position closer following, in list order, than an element currently pointed to by each respective one of the N−2 elements.

In operation 1008, the particular element S is added to the N-way linked list. In addition, a pointer of the (N−1)th element consecutive to the first location, in list order, is redirected to point to the inserted, particular element S. If the list is of the LIFO type, a pointer of the (N−1)th element consecutively following the first location, in list order, is redirected to point to the inserted, particular element S. If the list is of the FIFO type, a pointer of the (N−1)th element consecutively preceding the first location, in list order, is redirected to point to the inserted, particular element S.

In operation 1010, a pointer of the inserted, particular element S is set to point to the first sequential element. If the list is of the LIFO type, a previous element pointer of the inserted, particular element S is set to point to the first previous element. If the list is of the FIFO type, a following element pointer of the inserted, particular element S is set to point to the first following element.

Figure 11:
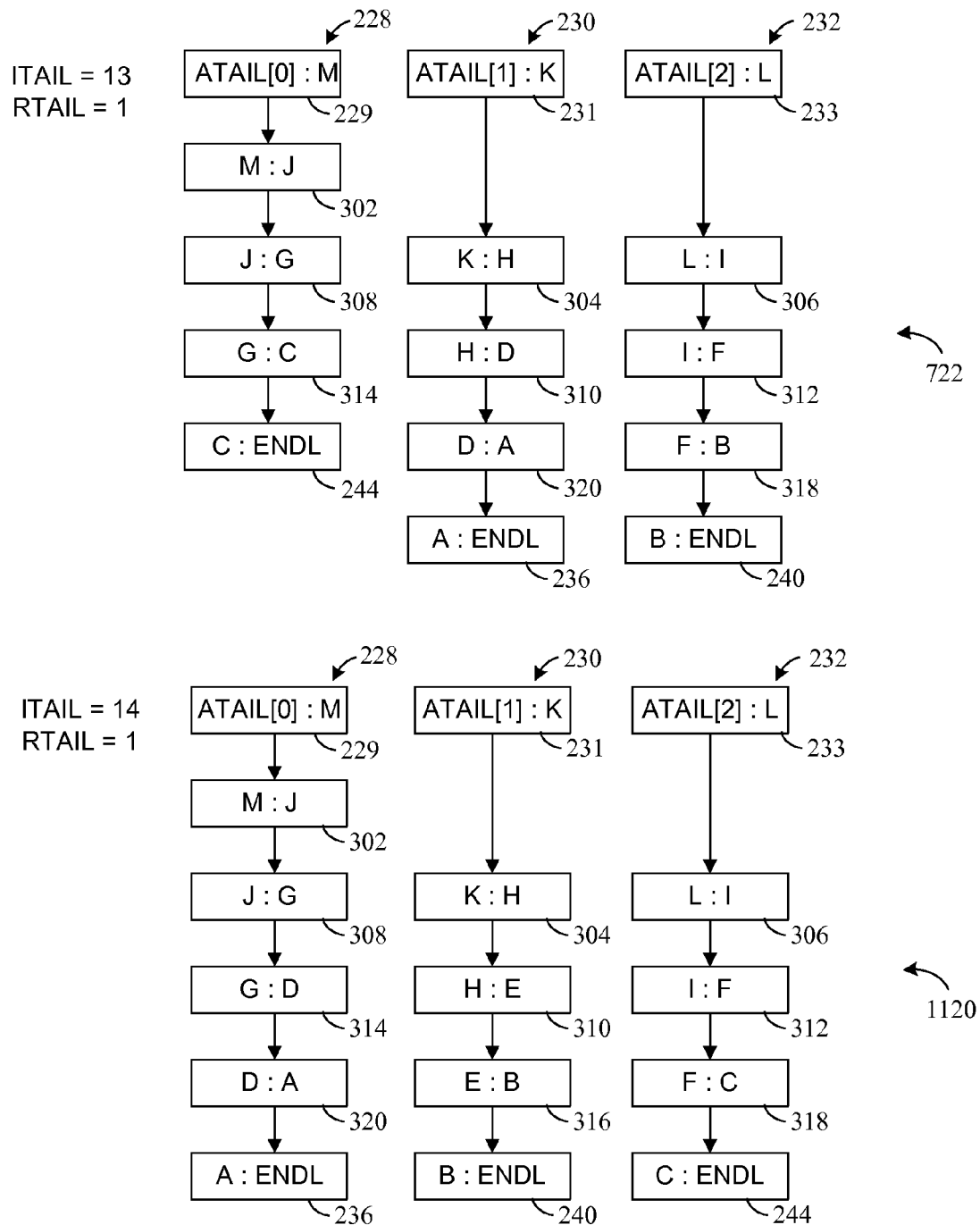
FIG. 11 illustrates an example of adding an element to a LIFO N-way linked list.

FIG. 11 illustrates an example of adding a particular element S to a LIFO N-way linked list. In this example, an element containing data E is added. In FIG. 11, reference number 722 points to an N-way linked list before adding the element E. Reference number 1120 points to the N-way linked list after the element E has been added.

In the example of FIG. 11, element F, 318 is identified as a first location for adding the particular element. The location of element F, 318 is a location that will, after adding the element E, be a location that will first follow, in list order, the inserted element E after it is added to list. Element F includes a previous element pointer that points to element B,

240. Element F may be referred to as a first element and element B may be referred to as a first previous element.

As the N-way linked list designated by reference number 1120 shows, the pointer of the first element F at the first location may be redirected to point to an element one position less previous, in list order, than an element currently pointed to by the first location, i.e., the first previous element B, 240 (operation 1004). The element "one position less previous" than B is element C, 244 and it may be seen that F points to C in the list designated by reference number 1120.

As the N-way linked list designated by reference number 1120 shows, respective pointers of the N−2 elements following the first location F, in list order, are redirected to point to an element one position less previous, in list order, than an element currently pointed to by a respective one of the N−2 elements (operation 1006). In this example, N−2=3−2=1. The one element following the first location F, in list order, is G, 314. The pointer of element G is redirected to point from C, 244 to an element one position less previous, in list order, than C, i.e., to D, 320.

As the N-way linked list designated by reference number 1120 shows, the particular element E is added to the N-way linked list. In addition, a pointer of the (N−1)th element following the first location, in list order, is redirected to point to the inserted, particular element E (operation 1008). In this example, N−1=3−1=2. The second element following the first location F, in list order, is H, 310. The pointer of element H is redirected to point from D, 320 to the inserted element E, 316. The pointer of the inserted, particular element E is set to point to the first previous element, i.e., element B, 240 (operation 1010).

Figure 12:
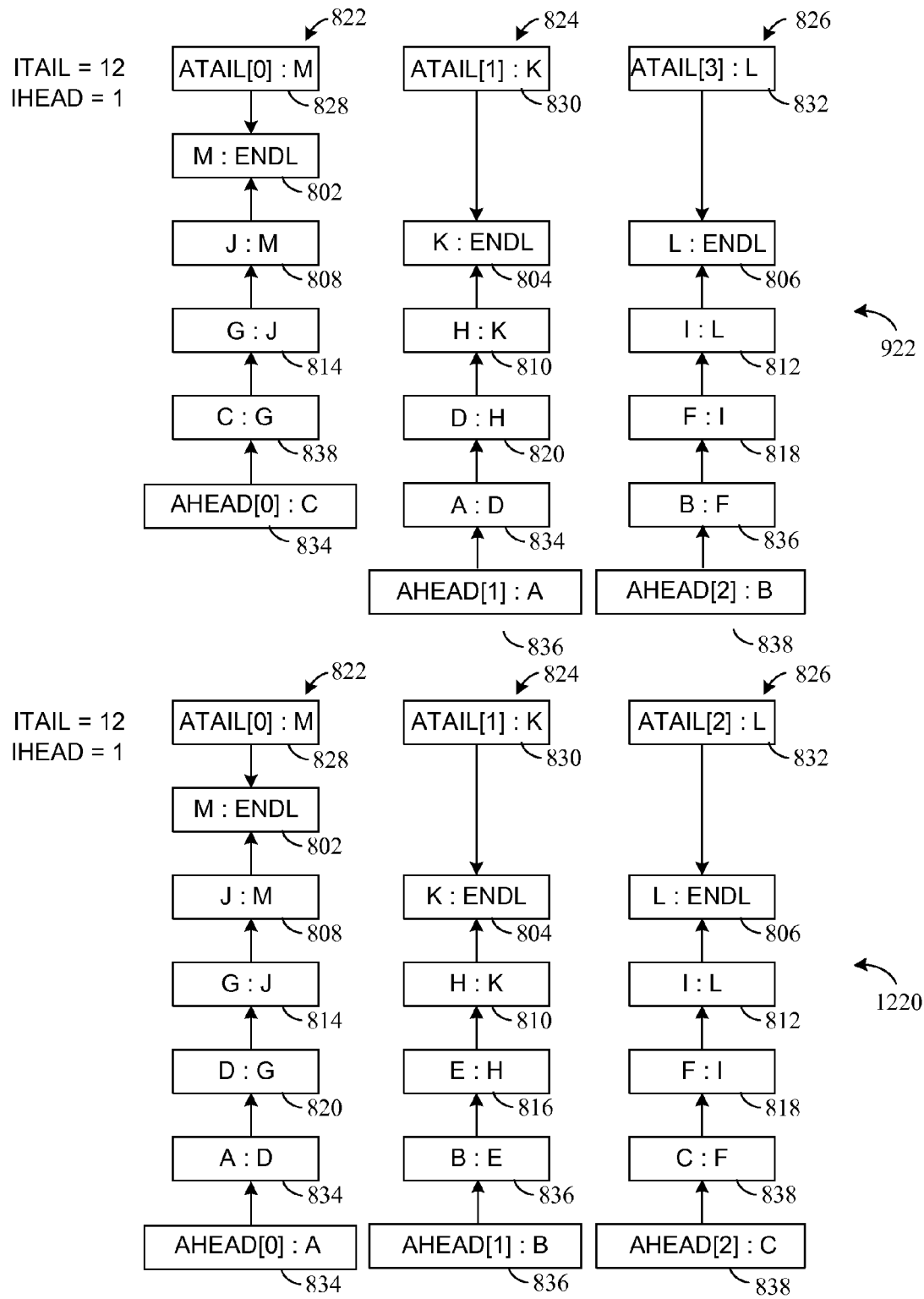
FIG. 12 illustrates an example of adding an element to a FIFO N-way linked list.

FIG. 12 illustrates an example of adding a particular element S to a FIFO N-way linked list. In this example, an element containing data E is added. In FIG. 12, reference number 922 points to an N-way linked list before adding the element E. Reference number 1220 points to the N-way linked list after the element E has been added.

In the example of FIG. 12, element D, 820 is identified as a first location for adding the particular element. The location of element D, 820 is a location that will, after adding the element E, be a location that will first precede, in list order, the inserted element E after it is added to list. Element D includes a following element pointer that points to element H, 810. Element D may be referred to as a first element and element H may be referred to as a first following element.

As the N-way linked list designated by reference number 1220 shows, the pointer of the first element D at the first location may be redirected to point to an element one position closer following, in list order, than an element currently pointed to by the first location, i.e., the first following element H, 240 (operation 1004). The element "one position closer following" than H is element G, 814 and it may be seen that D points to G in the list designated by reference number 1220.

As the N-way linked list designated by reference number 1220 shows, respective pointers of the N−2 elements preceding the first location D, in list order, are redirected to point to an element one position closer following, in list order, than an element currently pointed to by a respective one of the N−2 elements (operation 1006). In this example, N−2=3−2=1. The one element preceding the first location D, in list order, is C, 838. The pointer of element C is redirected to point from G, 814 to an element one position closer following, in list order, than G, i.e., to F, 818.

As the N-way linked list designated by reference number 1220 shows, the particular element E is added to the N-way linked list. In addition, a pointer of the (N−1)th element previous to the first location, in list order, is redirected to point to the inserted, particular element E (operation 1008). In this example, N−1=3−1=2. The second element preceding the first location D, in list order, is B, 836. The pointer of element B is redirected to point from F, 818 to the inserted element E, 816. The pointer of the inserted, particular element E is set to point to the first following element, i.e., element H, 810 (operation 1010).

Referring again to FIG. 1C, elements of an N-way doubly-linked list may include both a following element pointer field 124 and a previous element pointer field 122. Any of the methods for accessing a LIFO type N-way linked list described in this Detailed Description may be employed with an N-way doubly-linked list. Similarly, any of the methods for accessing a FIFO type N-way linked list described in this Detailed Description may be employed with an N-way doubly-linked list.

An XOR N-way linked list is a space-saving variation of an N-way doubly-linked list. According to Boolean algebra, A XOR (A XOR B)=B, and B XOR (A XOR B)=A. An XOR N-way linked list employs these identities on a bit-by-bit basis to use just one field to store addresses of both a previous and a following element. Substituting previous and following for A and B, the relationships become: PREVIOUS XOR (PREVIOUS XOR FOLLOWING)=FOLLOWING, and FOLLOWING XOR (PREVIOUS XOR FOLLOWING)=PREVIOUS. An element stores (PREVIOUS XOR FOLLOWING) for each bit. PREVIOUS may then be XORed with stored value to obtain FOLLOWING, and visa versa. Any of the methods for accessing a LIFO or a FIFO type N-way linked list described in this Detailed Description may be employed with an XOR N-way doubly-linked list.

Java is a programming language. Java is registered trademarks of Oracle. The Java language includes a Linked List public class, which may be used to implement the various embodiments described in this Detailed Description. In addition, the various embodiments may be implemented using any other suitable programming language.

Various embodiments described in this Detailed Description may be implemented in a computer system that supports SIMD operations. As an example, the Intel x86 processor architecture includes the MMX extension, which supports a variety of SIMD instructions. As yet another example, the IBM Power processor architecture includes instructions that provide for multiple outstanding loads with a single instruction. For a processor that supports M loads with a single instruction, an N-way linked list may be traversed by reading N elements at a time, M being greater than or equal to N. Accordingly, an N-way linked list may be traversed using a SIMD processor faster than a conventional linked list according to various embodiments. A processor that supports M loads with a single instruction, M greater than or equal to N, enables a single thread having one or more SIMD instructions to traverse an N-way linked list by reading N elements at a time.

In various embodiments, an N-way linked list may be traversed from any element within the list, rather than from the tail or head of the list. Embodiments that allow an N-way linked list to be traversed from any element within the list may include a sequential element pointer field 134 (FIG. 1D). The sequential element pointer field 134 points to a next sequential element in list order. If the list is a LIFO type list, the sequential element pointer field 134 points to a next following element in list order, as shown in FIG. 1D. If the list is a FIFO type list, the sequential element pointer field 134 points to a next previous element in list order.

As an example, and referring to FIG. 1D, a request to remove element E, 144 may start with a reference to the element E. The sequential element pointer field 134 may be used to identify N elements that need to have their pointers updated in the removal operation. Element E points to element F, 146 as a next sequential field in list order. Element F points to element G, 148 as a next sequential field in list order. Element G points to element H, 150 as a next sequential field in list order. In addition, the previous element pointer field of G points to element D, 142, the next previous element of G in sub-list 20. As described in this Detailed Description, removal of element E from an LIFO N-way linked list only requires that the pointers of elements F, G, H, and I be updated. Use of the sequential element pointer field 134 makes it unnecessary to traverse an N-way linked list from the tail or head of the list. While the example presented in this paragraph is directed to LIFO type list, the sequential element pointer field 134 may be used in a similar manner to identify elements that need to have their pointers updated in the removal operation for FIFO, doubly-linked, or XOR type lists. Moreover, the sequential element pointer field 134 may be used in a similar manner to identify elements that need to have their pointers updated in the operation to add an element to LIFO, FIFO, doubly-linked, or XOR type lists.

Atomic Memory Operations on an N-Way Linked List

In various embodiments, atomic memory operations (AMO) may be used for one or more of the operations of methods for popping an element off of or pushing an element on to an N-way linked list. According to various embodiments, AMOs that operate on the handle of an N-way linked list (NLL) are provided. The use of an AMO or instruction may be particularly advantageous if the handle to the N-Way linked list is capable of being stored in a single cache line of a cache memory. In various embodiments, the handle of the N-Way linked list fits into one cache line. Atomic memory instructions according to various embodiments allow multiple threads to access an N-way linked list concurrently while preserving the order of the N-way linked list.

Figure 13:
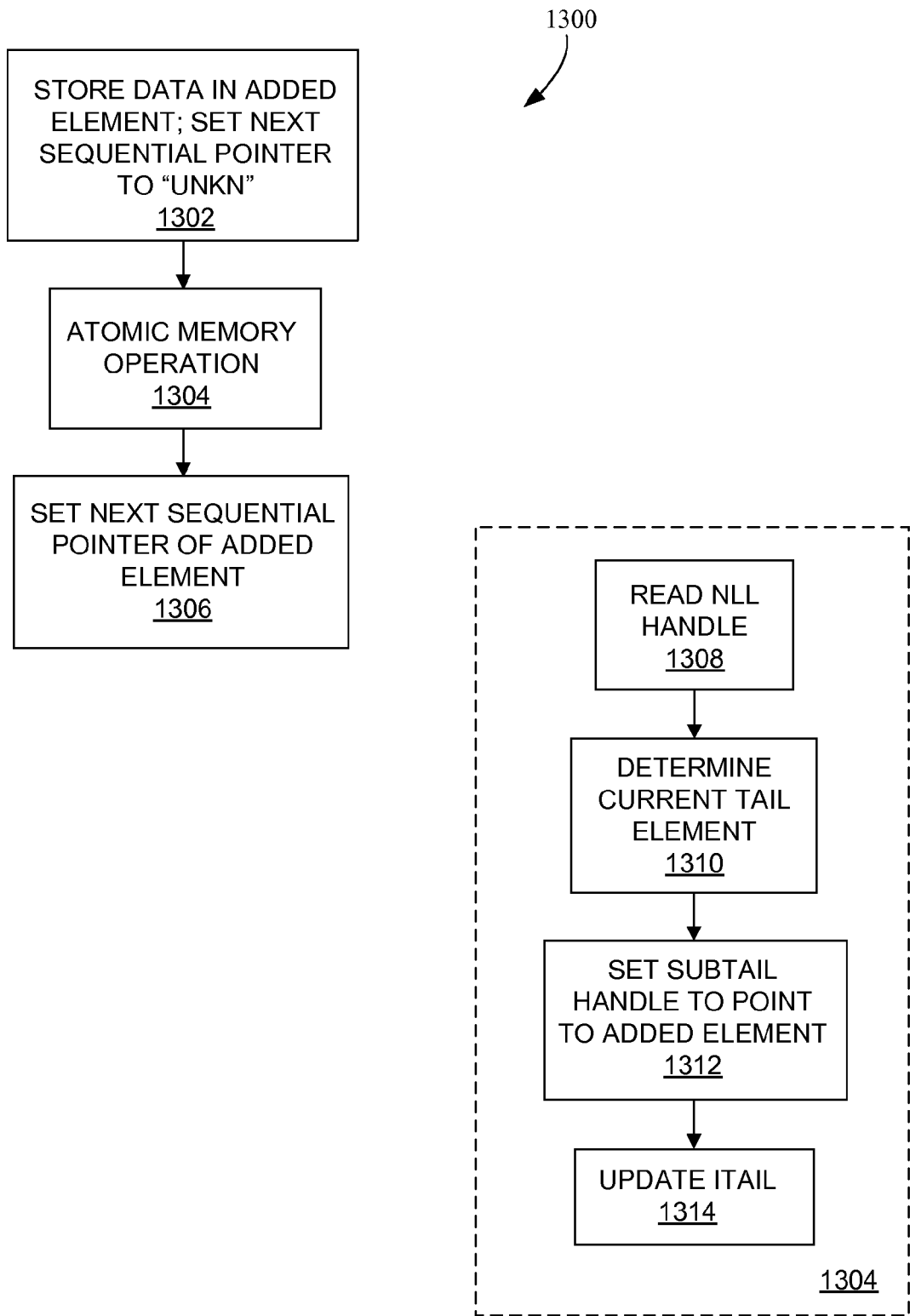
FIG. 13 is a flow diagram of an exemplary process for pushing an element to an N-way linked list in a computer memory according to various embodiments.

FIG. 13 is a flow diagram of an exemplary process 1300 for pushing an element on to an N-way linked list in a computer memory according to various embodiments. The process 1300 enables N elements to be simultaneously or concurrently pushed on to an N-way linked list using AMOs. The N elements may be simultaneously pushed on to an N-way linked list using N threads. In operation 1302, a conventional store operation stores the added element in memory and sets the next sequential element pointer of the added element to point to an unknown location (UNKN). In operation 1304, an AMO is used to read the NLL handle (operation 1308). The handle may include two or more sub-list tail handles and a parameter ITAIL. In operation 1310, the current tail element may be determined from ITAIL, as described elsewhere in this Detailed Description. The current tail element becomes a former tail element in this push operation. In operation 1312, the sub-list tail handle that will point to the new tail element is updated. Specifically, the operation 1312 may include an AMO swap operation in which the pointer to the location or address of the current tail element is swapped with a pointer to the location or address of the newly added tail element. In operation 1314, ITAIL is updated. In operation 1306, a conventional store operation writes a next sequential element pointer to the added element. This operation changes the next sequential element pointer in the added element to point from an unknown location (UNKN) to the element previously pointed to as the tail element.

In FIG. 13, the operation 1304 is depicted as including operations 1308, 1310, 1312, and 1314. In various alternative embodiments, one or more of operation 1308 (read NLL handle), operation 1310 (determine current tail element), and operation 1314 (update tail) may not be included in the atomic memory operation 1304. One or more of the operations 1308, 1310, and 1314 may be performed before or after the atomic memory operation 1304.

The UNKN marker indicates to other threads and processes that there is an outstanding operation to be completed. The UNKN marker may allow another thread to push an element on to the NLL once the AMO 1304 is complete. If a particular sub-list has a first element that has been pushed on to the list (the push-tail AMO has completed), but the next sequential element pointer of the first element remains set to the UNKN marker because the operation 1306 has not yet been completed, other threads may push an element on to another sub-list or on to the same particular sub-list of the NLL. In other words, another thread can push a second element on to the NLL before the thread pushing the first element replaces the UNKN marker with the location of the former tail element. At various points in time, a sub-list may include two or more elements that have been pushed on to the sub-list, each of the elements having a next sequential element pointer with the UNKN marker. Accordingly, the process 1300 allows multiple threads to push elements on to an NLL at high rate. The process 1300 is gated by the push-tail AMO rate.

The operation 1310 of process 1300 may also include determining whether the current tail element includes a designation that that the tail element is involved in pop process (described with respect to process 1500). If it is determined that the current tail element includes a pop process designation, the operation 1304 may fail.

Figure 14A:
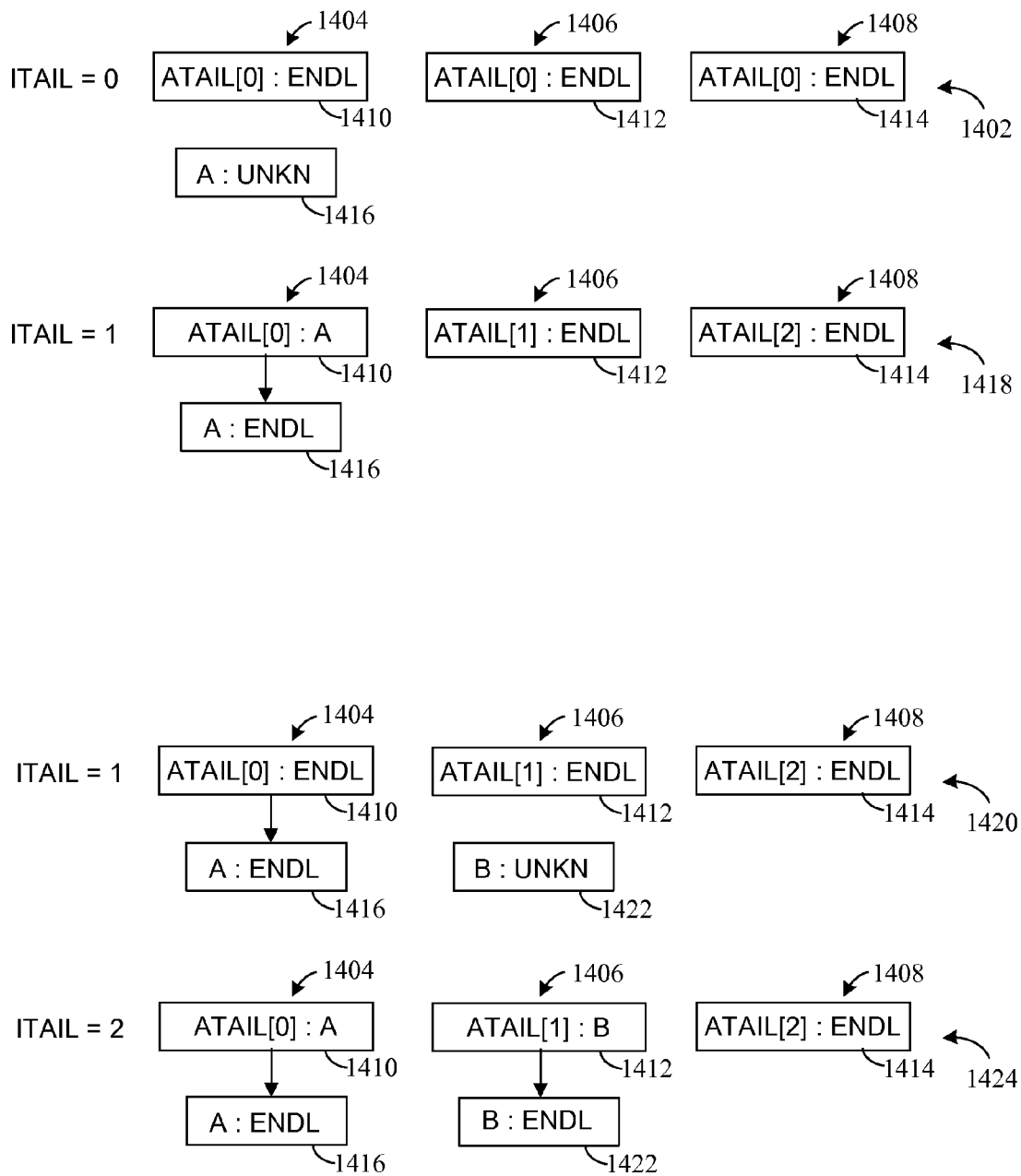
FIGS. 14A-14B illustrate an example of pushing elements on to the tail of an N-way linked list using the process of FIG. 13.
Figure 14B:
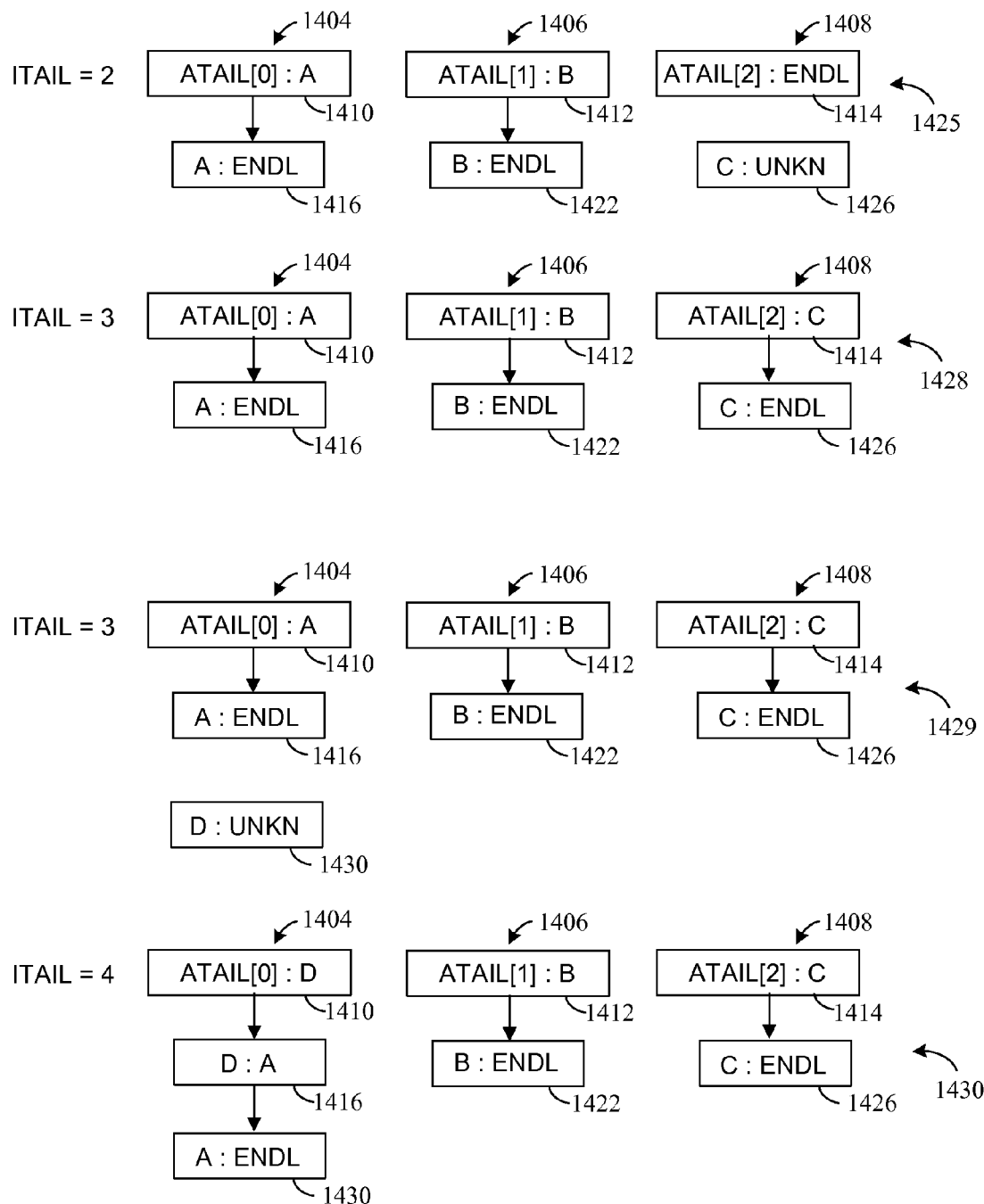

FIGS. 14A-14B illustrate an example of pushing elements on to the tail of an N-way linked list using the process 1300. Reference number 1402 points to an empty N-way linked list. The list includes three sublists: 1404, 1406, and 1408, and three sub-list tail elements: ATAIL[0], 1410, ATAIL[1], 1412, and ATAIL[2], 1414. Element A, 1416 is to be pushed on to the list. Before a push-tail AMO, a conventional store operation stores element A in memory and sets its next sequential element pointer (in sub-list 1404) to point to an UNKN marker. In the push-tail AMO, the handle is read, the current tail element is determined to be ATAIL[0], the sub-list tail handle ATAIL[0] is updated to point to the added element A, and ITAIL is updated. Subsequent to the AMO, conventional store operation changes the next sequential element pointer in A to point from an UNKN marker to the element previously pointed to as the tail element, i.e., ENDL. Reference 1418 number points to the N-way linked list after all operations for pushing A on to the list are complete.

Reference number 1420 points to an N-way linked list before an element B, 1422 is to be pushed on to the list. Reference number 1424 points to the N-way linked list after all operations for pushing B on to the list are complete.

Reference number 1425 points to an N-way linked list before an element C, 1426 is to be pushed on to the list. Reference number 1428 points to the N-way linked list after all operations for pushing C on to the list are complete.

Reference number 1429 points to an N-way linked list before an element D, 1430 is to be pushed on to the list. Reference number 1430 points to the N-way linked list after all operations for pushing D on to the list are complete.

In various embodiments, the process 1300 may be employed with a LIFO type N-way linked list. Further, in various embodiments the process 1300 may be employed with an N-way doubly-linked list or an XOR N-way linked list.

Figure 15:
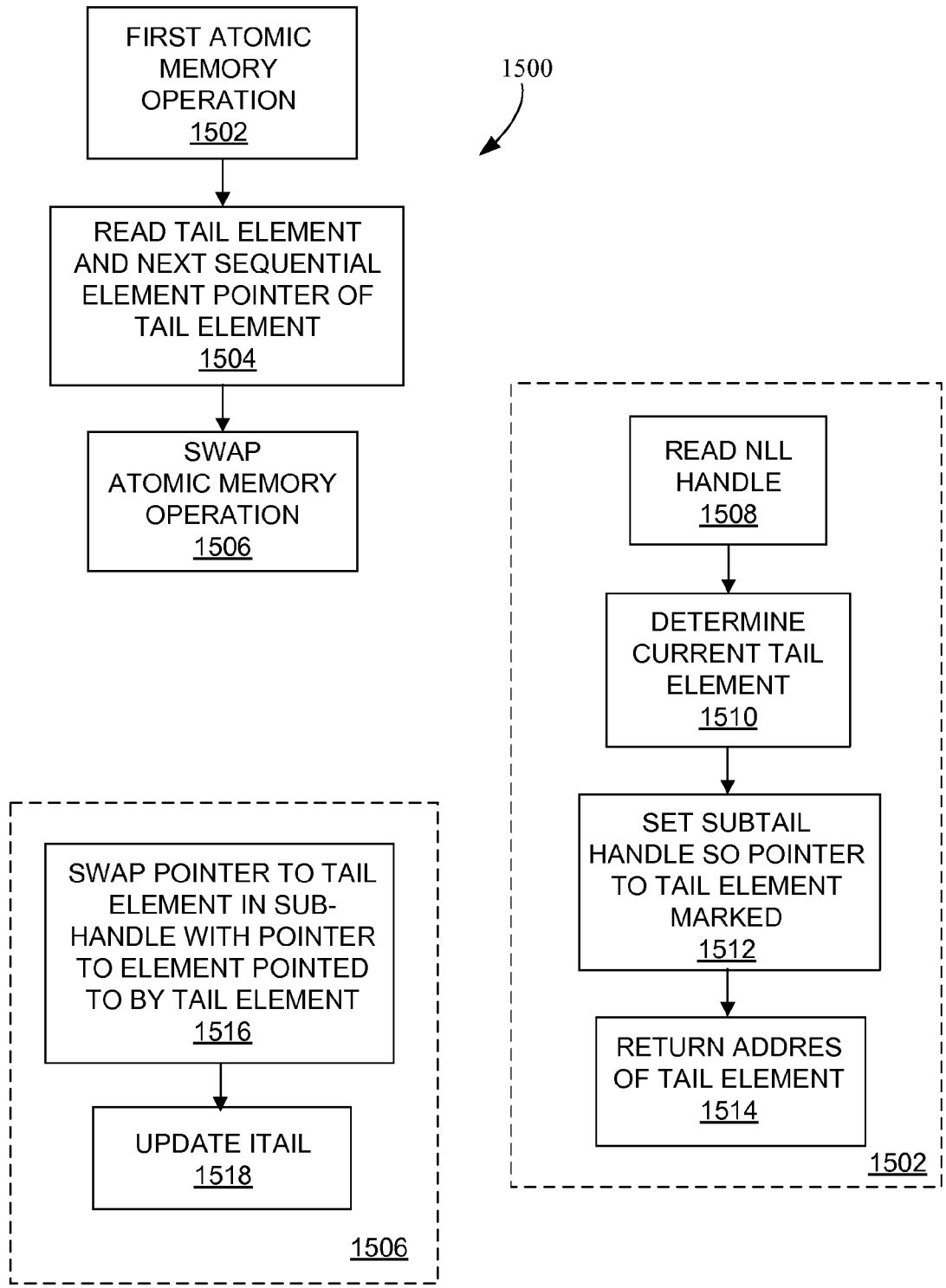
FIG. 15 is a flow diagram of an exemplary process for popping an element off of an N-way linked list in a computer memory according to various embodiments.

FIG. 15 is a flow diagram of an exemplary process 1500 for popping an element off of an N-way linked list in a computer memory according to various embodiments. In operation 1502, a first AMO is performed. The first AMO may be a pop AMO. The pop AMO reads the NLL handle (operation 1508). In operation 1510, the current tail element may be determined from ITAIL. In operation 1512, the sub-list tail handle pointer to the tail element is marked with a designation indicating that the tail element is involved in a pop process. In operation 1514, the location or address of the tail element is returned for use in operation 1504. In operation 1504, a conventional load operation reads the tail element and determines the next sequential element in the same sub-list, which is stored in the next sequential element field of the tail element. Operation 1504 returns the next sequential element pointer of the current tail element for use in operation 1506. The operation 1506 is a second AMO or a swap AMO that includes operation 1516. In operation 1516, the sub-list tail handle is read. In addition, the location of the next sequential element is written to the sub-list tail handle, thereby designating the next sequential element as the new tail element. This operation also removes the mark designating that the tail element is involved in pop process. In operation 1518, ITAIL is updated.

In FIG. 15, the operation 1502 is depicted as including operations 1508, 1510, 1512, and 1514. In various alternative embodiments, one or more of operation 1508 (read NLL handle), operation 1510 (determine current tail element), and operation 1514 (return address of tail element) may not be included in the first atomic memory operation 1502. One or more of the operations 1508, 1510, and 1514 may be performed before or after the first atomic memory operation 1502. In addition, the operation 1506 is depicted as including operations 1516 and 1518. In various alternative embodiments, operation 1518 (update ITAIL) may not be included in the second atomic memory operation 1506. The operation 1518 may be performed before or after the second atomic memory operation 1506.

Figure 16:
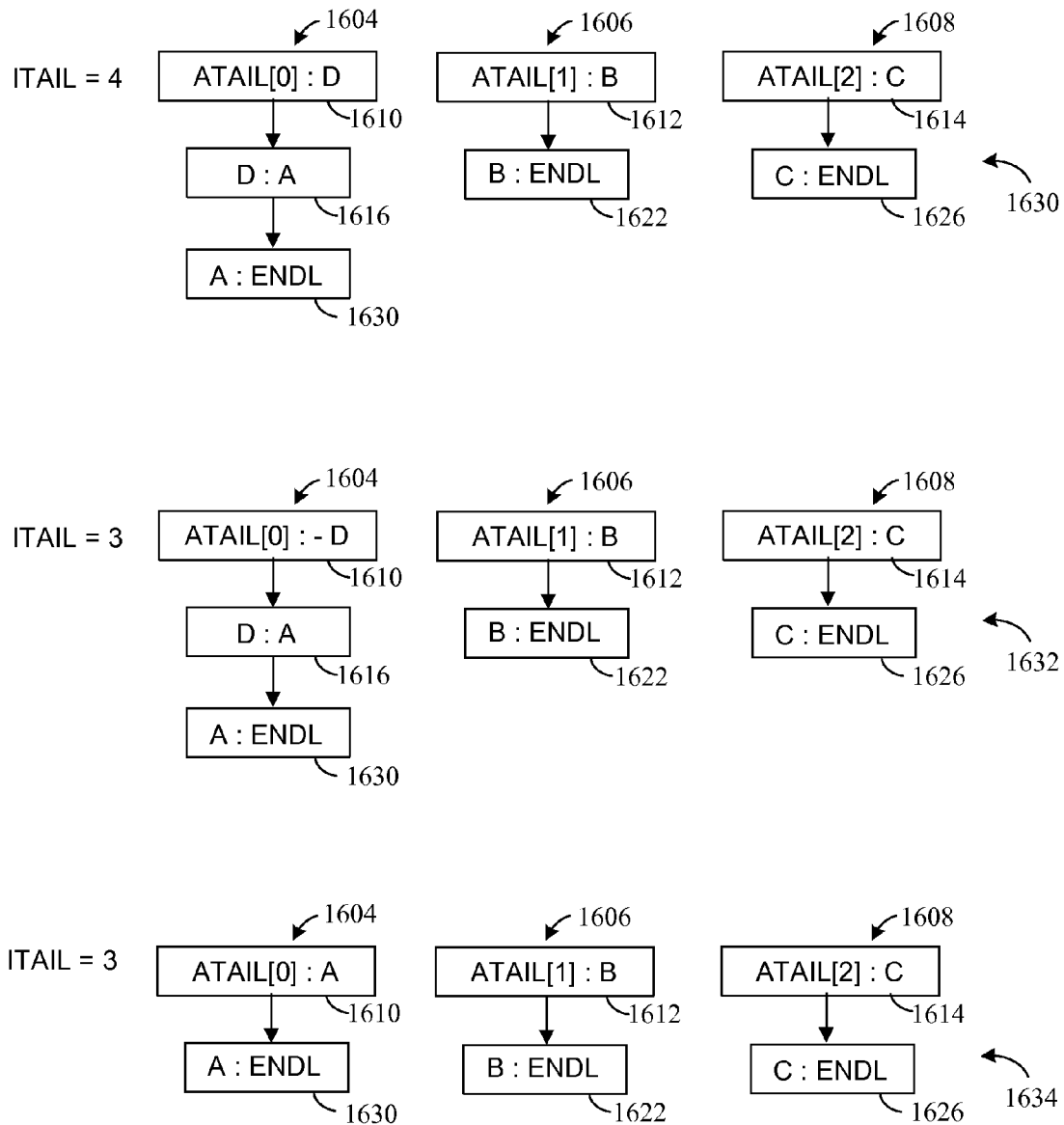
FIG. 16 illustrates an example of popping an element off the tail of an N-way linked list using the process of FIG. 15.

FIG. 16 illustrates an example of popping an element off the tail of an N-way linked list using the process 1500. Reference number 1630 points to an N-way linked list. The list includes three sublists: 1604, 1606, and 1608, and three sub-list tail elements: ATAIL[0], 1610, ATAIL[1], 1612, and ATAIL[2], 1614. In addition, the list includes elements D, 1616, B, 1622, C, 1626, and A, 1630. Element D, 1616 is to be popped off this list. In a first AMO, the NLL handle is read and the current tail element is determined to be D, 1616. As indicated in the N-way linked list pointed to by reference number 1632, the pointer of the sub-tail tail element of ATAIL[0], 1610 is marked with an exemplary designation ("-"), indicating that the tail element D, 1616 is involved in a pop process. The marking may be done as part of the first AMO operation 1502. In addition, the first AMO operation returns the address of the tail element D for use in a subsequent operation that reads the element pointed to by the next sequential element pointer of the tail element D. (The element pointed to by the next sequential element pointer of the tail element D is element A, 1630.) The N-way linked list pointed to by reference number 1634 shows the list after a swap AMO operation has been completed. In the swap AMO, the pointer of the tail element ATAIL[0], 1610 is read and replaced with the pointer in element D, 1616 to the tail element A, 1630. The mark designating that the tail element is involved in pop process is removed. In addition, ITAIL may be updated.

The process 1500 pops an element off of an N-way linked list. The process 1500 includes marking the pointer to the tail element in the sub-list tail handle with a designation indicating that the tail element is involved in a pop process. If another thread attempts to push an element on to the NLL, the attempt will fail because of the designation that the tail element is involved in a pop process. An element may not be pushed on to the NLL until the pop operation in the process 1500 completes. In order for a new element to be pushed to the NLL, the new element's pointer to a next sequential element in a same sub-list needs to be set to the current tail element, however, if the pop process 1500 is underway, the change being made by that process to the current tail element has not yet completed. In addition, in the case of a LIFO NLL, a sequence of pop operations by other threads may be paused until the designation indicating that the tail element is involved in pop process is cleared. Again, the designation that the tail element is involved in pop process blocks other subsequent thread's ability to pop an element off of a LIFO NLL.

In various embodiments the process 1500 may be employed with a LIFO type N-way linked list. Further, in various embodiments the process 1500 may be employed with an N-way doubly-linked list or an XOR N-way linked list.

Figure 17:
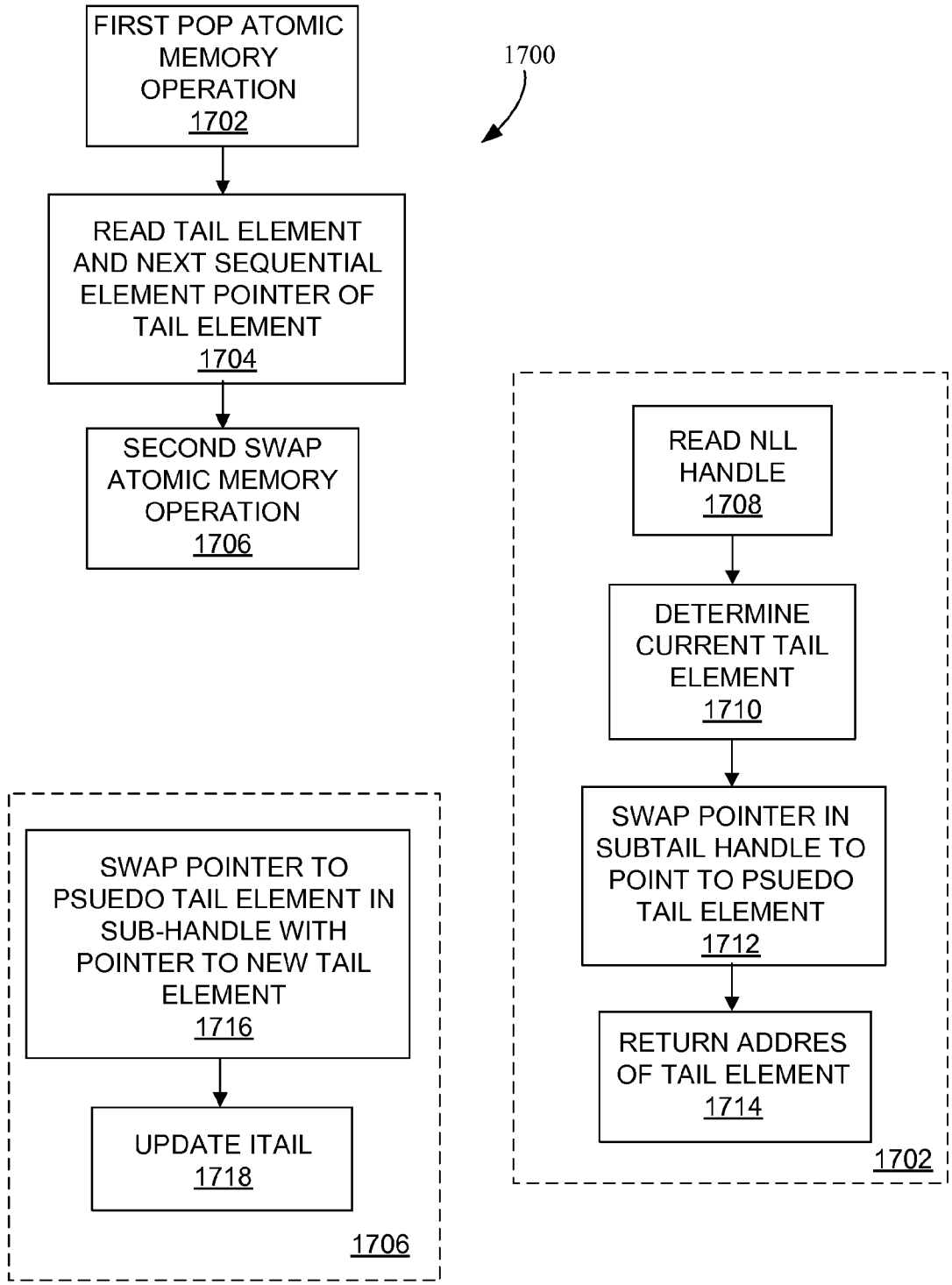
FIG. 17 is a flow diagram of an exemplary process for popping an element off of an N-way linked list in a computer memory according to various embodiments.

FIG. 17 is a flow diagram of an exemplary process 1700 for popping an element off of an N-way linked list in a computer memory according to various embodiments. The process 1700 does not block the ability of N other subsequent threads to pop an element off of a LIFO NLL. The process 1700 enables N elements to be simultaneously or concurrently popped off of an N-way linked list. N elements may be popped off an N-way linked list in parallel using N threads. In operation 1702, a first AMO, which may be a pop AMO, is performed. The operation 1702 includes reading the NLL handle (operation 1708). In operation 1710, the current tail element may be determined from ITAIL. In operation 1712, the sub-list tail handle is marked with a pseudo element, e.g., pseudo element "bounce" or "BNCE." The pseudo element is a designation indicating that the particular sub-list is involved in a pop process. In operation 1714, the address or location of the tail element is returned for use in operation 1704. In operation 1704, a conventional load operation reads the current tail element and the next sequential element pointer of the current tail element, which gives the address or location of the next sequential element of the particular sub-list. Operation 1704 returns location of the next sequential element for use in operation 1706. The operation 1706 is a second AMO, which may be a swap AMO, that includes operation 1716. In operation 1716, the pseudo tail element BNCE in the sub-list tail handle is replaced with location of the next sequential element pointer in operation 1704. In other words, the location of the next sequential element of the particular sub-list is written to the sub-list tail handle of the particular sub-list, thereby designating the next sequential element as a new tail element of the particular sub-list, and the first pseudo element is removed from the sub-list tail handle of the particular sub-list. When operation 1706 is complete, the element pointed to by the next sequential element pointer returned in operation 1704 becomes the current tail element. In operation 1718, ITAIL is updated.

In FIG. 17, the operation 1702 is depicted as including operations 1708, 1710, 1712, and 1714. In various alternative embodiments, one or more of operation 1708 (read NLL handle), operation 1710 (determine current tail element), and operation 1714 (return address of tail element) may not be included in the first swap atomic memory operation 1702. One or more of the operations 1708, 1710, and 1714 may be performed before or after the first swap atomic memory operation 1702. In addition, the operation 1706 is depicted as including operations 1716 and 1718. In various alternative embodiments, operation 1718 (update ITAIL) may not be included in the second swap atomic memory operation 1706. The operation 1718 may be performed before or after the second swap atomic memory operation 1706.

Figure 18:
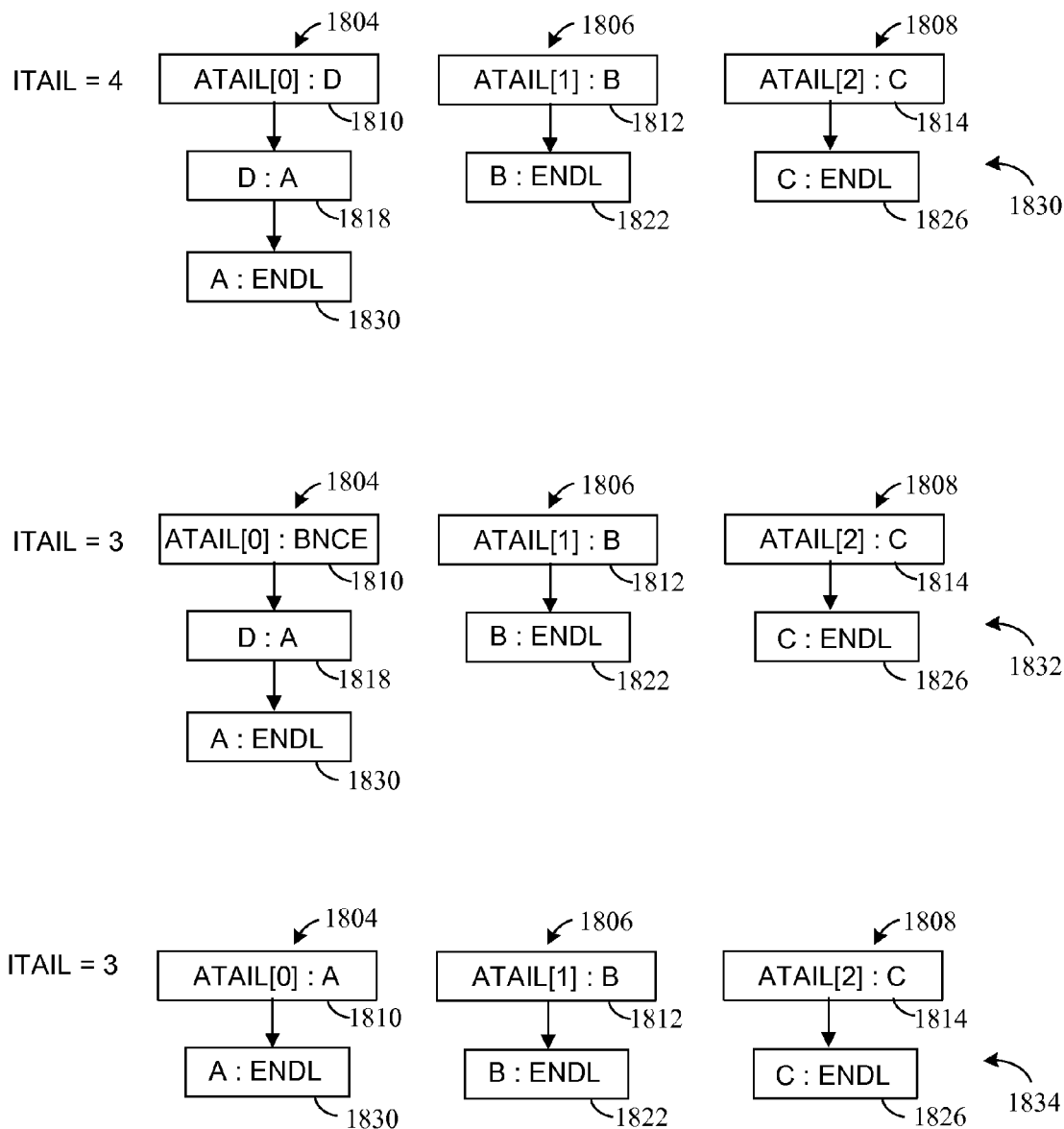
FIG. 18 illustrates an example of popping an element off the tail of an N-way linked list using the process.

FIG. 18 illustrates an example of popping an element off the tail of an N-way linked list using the process 1700. Reference number 1830 points to an N-way linked list. The list includes three sublists: 1804, 1806, and 1808, and three sub-list tail elements: ATAIL[0], 1810, ATAIL[1], 1812, and ATAIL[2], 1814. In addition, the list includes elements D, 1818, B, 1822, C, 1826, and A, 1830. Element D, 1818 is to be popped off this list. In a first swap AMO, the NLL handle is read and the current tail element is determined to be D, 1818. As indicated in the N-way linked list pointed to be reference number 1832, the pointer of the sub-tail tail element of ATAIL[0], 1810 that points to the tail element D, 1818 is swapped with a pseudo tail element BNCE. The first swap may be done as part of an AMO operation 1702. In addition, the AMO operation returns the address of the tail element D for use in a subsequent operation that reads the next sequential element pointer of the tail element. The N-way linked list pointed to be reference number 1834 shows the list after a second swap AMO operation has been completed. In the second swap AMO, the pointer of the sub-tail tail element ATAIL[0], 1810 that points to BNCE is read and replaced with the element A, 1830. In addition, ITAIL is updated.

A subsequent thread attempting to pop an element to or from an NLL will be given the pseudo tail element BNCE as the current end element of the NL. Subsequent threads may be configured to recognize the pseudo tail element BNCE. When a subsequent thread attempting a pop receives BNCE, the thread is configured to poll the sub-tail element until it is updated with the actual element. The pointer to a BNCE pseudo element may be identified by setting an otherwise unused address bit. The process 1700 allows N elements to be popped from an N-way linked list in parallel.

Figure 19:
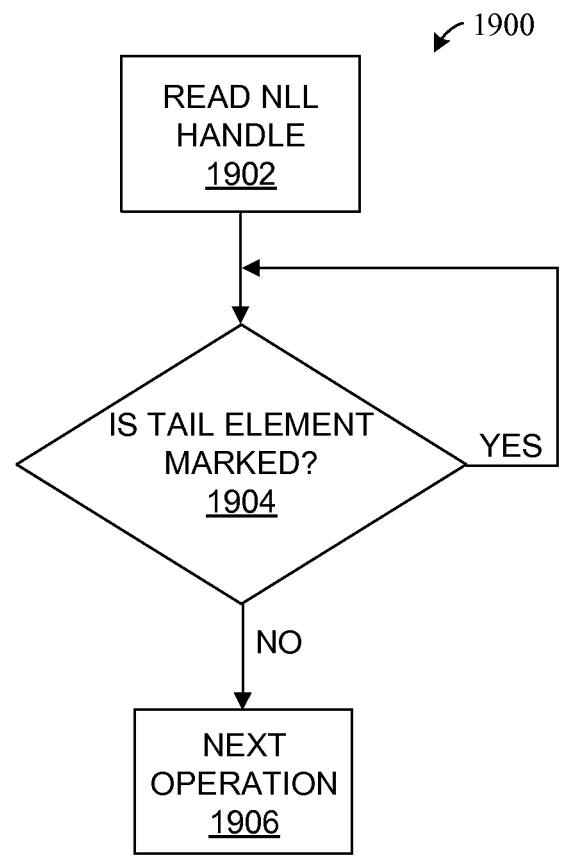
FIG. 19 illustrates a process that may be employed by a thread attempting a pop an element from an N-way linked list according to various embodiments.

FIG. 19 illustrates a process 1900 that a thread attempting a pop an element from an NLL may employ in various embodiments. In operation 1902, the thread may read the NLL handle. In operation 1904, the thread may determine whether the tail element is identified as a pseudo element, that is marked as BNCE. If the tail element is marked BNCE, the thread may poll the sub-tail element until it is updated with the actual element. If it is determined that the tail element is an actual element, the process 1900 moves to a next operation 1906. The next operation may be any suitable operation involved in a pop operation.

In various embodiments the process 1900 may be employed with a LIFO type N-way linked list. Further, in various embodiments the process 1900 may be employed with an N-way doubly-linked list or an XOR N-way linked list.

Computer System

Figure 20:
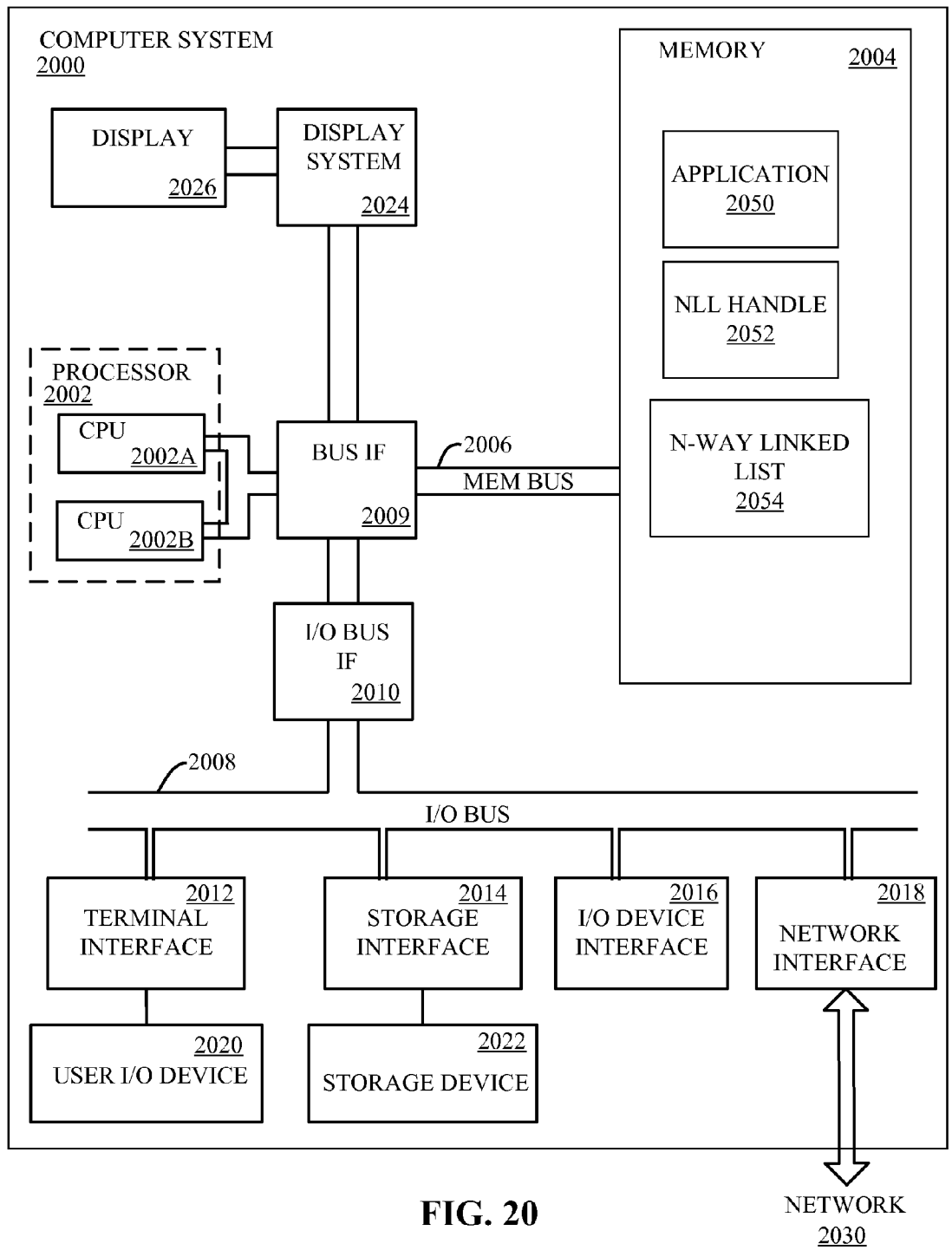
FIG. 20 illustrates an exemplary computer system according to various embodiments.

FIG. 20 is a schematic block diagram illustrating one embodiment of a computer system 2000. The computer system 2000 is one exemplary context in which embodiments may be implemented. The mechanisms and apparatus of the various embodiments disclosed herein apply equally to any appropriate computing system. The major components of the computer system 2000 include one or more processors 2002, a memory 2004, a terminal interface 2012, a storage interface 2014, an Input/Output ("I/O") device interface 2016, and a network interface 2018, all of which are communicatively coupled, directly or indirectly, for inter-component communication via a memory bus 2006, an I/O bus 2008, a bus interface unit ("BUS IF") 2009, and an input/output bus interface unit ("I/O BUS IF") 2010.

The computer system 2000 may contain one or more general-purpose programmable central processing units (CPUs) 2002A and 2002B, herein generically referred to as the processor 2002. In an embodiment, the computer system 2000 may contain multiple processors or cores; however, in another embodiment, the computer system 2000 may alternatively be a single CPU system. Each processor 2002 executes instructions stored in the memory 2004. In addition, each processor may include one or more levels of on-board cache, e.g., L1, L2, and L3. Moreover, the processors 2002 may support SIMD operation. Further, in various embodiments, the processors 2002 may provide hardware support for atomic operations.

In an embodiment, the memory 2004 may include a random-access semiconductor memory, storage device, or storage medium (either volatile or non-volatile) for storing or encoding data and programs. In another embodiment, the memory 2004 represents the entire virtual memory of the computer system 2000, and may also include the virtual memory of other computer systems coupled to the computer system 2000 or connected via a network 2030. The memory 2004 is conceptually a single monolithic entity, but in other embodiments the memory 2004 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 2004 may store all or a portion of the following: an application 2050, an NLL handle 2052, and an N-way linked list 2054. These programs and data structures are illustrated as being included within the memory 2004 in the computer system 2000, however, in other embodiments, some or all of them may be on different computer systems and may be accessed remotely, e.g., via a network 2030. The computer system 2000 may use virtual addressing mechanisms that allow the programs of the computer system 2000 to behave as if they only have access to a large, single storage entity instead of access to multiple, smaller storage entities. Thus, while the application 2050, NLL handle 2052, and N-way linked list 2054 are illustrated as being included within the memory 2004, these components are not necessarily all completely contained in the same storage device at the same time. As one example, in various embodiments, the NLL handle may be stored in a cache on board the processor 2002. Further, although the application 2050, NLL handle 2052, and N-way linked list 2054 are illustrated as being separate entities, in other embodiments some of them, portions of some of them, or all of them may be packaged together. Moreover, although the N-way linked list 2054 is shown in one location in memory, the individual elements of the NLL 2054 need not be stored in a single contiguous location in memory; the elements may be stored in a variety of locations and addresses.

In an embodiment, the application 2050, NLL handle 2052, and N-way linked list 2054 may include instructions or statements that execute on the processor 2002 or instructions or statements that are interpreted by instructions or statements that execute on the processor 2002 to carry out the functions as further described in this Detailed Description. In another embodiment, the application 2050 may be implemented in hardware via semiconductor devices, chips, logical gates, circuits, circuit cards, and/or other physical hardware devices in lieu of, or in addition to, a processor-based system. In an embodiment, the application 2050, NLL handle 2052, and N-way linked list 2054 may include data in addition to instructions or statements.

The computer system 2000 may include a bus interface unit 2009 to handle communications among the processor 2002, the memory 2004, a display system 2024, and the I/O bus interface unit 2010. The I/O bus interface unit 2010 may be coupled with the I/O bus 2008 for transferring data to and from the various I/O units. The I/O bus interface unit 2010 communicates with multiple I/O interface units 2012, 2014, 2016, and 2018, which are also known as I/O processors ("IOPs") or I/O adapters (IOAs), through the I/O bus 2008. The display system 2024 may include a display controller, a display memory, or both. The display controller may provide video, audio, or both types of data to a display device 2026. The display memory may be a dedicated memory for buffering video data. The display system 2024 may be coupled with a display device 2026, such as a standalone display screen, computer monitor, television, or a tablet or handheld device display. In an embodiment, the display device 2026 may include one or more speakers for rendering audio. Alternatively, one or more speakers for rendering audio may be coupled with an I/O interface unit. In alternate embodiments, one or more of the functions provided by the display system 2024 may be on board an integrated circuit that also includes the processor 2002. In addition, one or more of the functions provided by the bus interface unit 2009 may be on board an integrated circuit that also includes the processor 2002.

The I/O interface units support communication with a variety of storage and I/O devices. For example, the terminal interface unit 2012 supports the attachment of one or more user I/O devices 2020, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 2020 and the computer system 2000, and may receive output data via the user output devices. For example, a user interface may be presented via the user I/O device 2020, such as displayed on a display device, played via a speaker, or printed via a printer.

The storage interface 2014 supports the attachment of one or more disk drives or direct access storage devices 2022 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 2022 may be implemented via any type of secondary storage device. The contents of the memory 2004, or any portion thereof, may be stored to and retrieved from the storage device 2022 as needed. The I/O device interface 2016 provides an interface to any of various other I/O devices or devices of other types, such as printers or fax machines. The network interface 2018 provides one or more communication paths from the computer system 2000 to other digital devices and computer systems; these communication paths may include, e.g., one or more networks 2030.

Although the computer system 2000 shown in FIG. 20 illustrates a particular bus structure providing a direct communication path among the processors 2002, the memory 2004, the bus interface 2009, the display system 2024, and the I/O bus interface unit 2010, in alternative embodiments the computer system 2000 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 2010 and the I/O bus 2008 are shown as single respective units, the computer system 2000 may, in fact, contain multiple I/O bus interface units 2010 and/or multiple I/O buses 2008. While multiple I/O interface units are shown, which separate the I/O bus 2008 from various communications paths running to the various I/O devices, in other embodiments, some or all of the I/O devices are connected directly to one or more system I/O buses.

In various embodiments, the computer system 2000 is a multi-user mainframe computer system, a single-user system, or a server computer or similar device that has little or no direct user interface, but receives requests from other computer systems (clients). In other embodiments, the computer system 2000 may be implemented as a desktop computer, portable computer, laptop or notebook computer, tablet computer, pocket computer, telephone, smart phone, or any other suitable type of electronic device.

FIG. 20 is intended to depict the representative major components of the computer system 2000. Individual components, however, may have greater complexity than represented in FIG. 20, components other than or in addition to those shown in FIG. 20 may be present, and the number, type, and configuration of such components may vary. Several particular examples of additional complexity or additional variations are disclosed herein; these are by way of example only and are not necessarily the only such variations. The various program components illustrated in FIG. 20 may be implemented, in various embodiments, in a number of different manners, including using various computer applications, routines, components, programs, objects, modules, data structures, etc., which may be referred to herein as "software," "computer programs," or simply "programs."

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While this disclosure has described the details of various embodiments shown in the drawings, these details are not intended to limit the scope of the invention as claimed in the appended claims.

What is claimed is:

1. A computer-implemented method for accessing a particular element of a plurality of elements stored in an N-way linked list in a computer memory, the N-way linked list having N linked sub-lists and a list order, each element being in one of the N sub-lists and including a pointer to a next sequential element in a same sub-list, comprising:
    identifying a location of the particular element;
    identifying respective locations of N neighbor elements consecutive to the particular element in list order;
    for each of the N neighbor elements, redirecting a pointer of a respective neighbor element to point to an element one position away, in list order, from an element currently pointed to by the respective neighbor element; and
    removing the particular element,
wherein the identifying of respective locations of N neighbor elements consecutive to the particular element in list order includes:
    identifying of respective locations of N neighbor elements following the particular element in list order; and
    redirecting, for each of the N neighbor elements, a pointer of the respective neighbor element to point to an element one position away, in list order, from an element currently pointed to by the respective neighbor element includes:
        redirecting a previous element pointer of the respective neighbor element to point to an element one position more previous, in list order, than an element currently pointed to by the previous element pointer of the respective neighbor element.

2. The method of claim 1, wherein:
the identifying of respective locations of N neighbor elements consecutive to the particular element in list order includes:
identifying of respective locations of N neighbor elements previous to the particular element in list order; and
redirecting, for each of the N neighbor elements, a pointer of the respective neighbor element to point to an element one position away, in list order, from an element currently pointed to by the respective neighbor element includes:
redirecting a following element pointer of the respective neighbor element to point to an element one position further following, in list order, than an element currently pointed to by the following element pointer of the respective neighbor element.

3. The method of claim 1, the identifying a location of the particular element further comprising traversing the N sub-lists in parallel.

4. The method of claim 1, the identifying a location of the particular element further comprises traversing the N sub-lists using a single instruction multiple data operation.

5. The method of claim 1, wherein elements are stored and fetched from a tail of the list according to a last-in-first-out scheme.

6. The method of claim 1, wherein elements are stored at a tail and fetched from a head of the list according to a first-in-first-out scheme.

7. A computer-implemented method for accessing a particular element of a plurality of elements stored in an N-way linked list in a computer memory, the N-way linked list having N linked sub-lists and a list order, each element being in one of the N sub-lists and including a pointer to a next sequential element in a same sub-list, comprising:
identifying a first location for adding the particular element, the first location having a first element, the first element having a pointer to a first sequential element;
redirecting the pointer of the first element to point to a neighbor element one position away, in list order, from the first sequential element;
redirecting respective pointers of N-2 neighbor elements consecutive to the first element, in list order, to point to a neighbor element one position away, in list order, than an element currently pointed to by the respective neighbor element;
adding the particular element and redirecting a pointer of an (N-1) neighbor element consecutive to the first location, in list order, to point to the particular element; and
setting the pointer of the particular element to point to the first sequential element,
wherein the first sequential element is a previous element;
the redirecting the pointer of the first element to point to an element one position away, in list order, from the first sequential element includes:
redirecting the pointer of the first element to point to a neighbor element one position less previous, in list order, than the first previous element;
the redirecting respective pointers of N-2 neighbor elements consecutive to the first location, in list order, to point to an element one position away, in list order, than an element currently pointed to by the respective neighbor element includes:
redirecting respective pointers of N-2 neighbor elements following the first location, in list order, to point to an element one position less previous, in list order, than an element currently pointed to by the respective neighbor element; and
the adding the particular element and redirecting a pointer of an (N-1) neighbor element consecutive to the first location, in list order, to point to the particular element includes:
redirecting a pointer of an (N-1) neighbor element following the first location, in list order, to point to the particular element.

8. The method of claim 7, wherein:
the first sequential element is a following element;
the redirecting the pointer of the first element to point to a neighbor element one position away, in list order, from the first sequential element includes:
redirecting the pointer of the first element to point to a neighbor element one position closer following, in list order, the first following element; and
the redirecting respective pointers of N-2 neighbor elements consecutive to the first location, in list order, to point to an element one position away, in list order, than an element currently pointed to by the respective neighbor element includes:
redirecting respective pointers of N-2 neighbor elements preceding the first location, in list order, to point to an element one position closer following, in list order, an element currently pointed to by the respective neighbor element; and
the adding the particular element and redirecting a pointer of an (N-1) neighbor element consecutive to the first location, in list order, to point to the particular element includes:
redirecting a pointer of an (N-1) neighbor element preceding the first location, in list order, to point to the particular element.

9. The method of claim 7, the identifying a first location for adding the particular element further comprising traversing the N sub-lists in parallel.

10. The method of claim 7, the identifying a first location for adding the particular element further comprising traversing the N sub-lists using a single instruction multiple data operation.

11. The method of claim 7, wherein elements are stored and fetched from a tail of the list according to a last-in-first-out scheme.

12. The method of claim 7, wherein elements are stored at a tail and fetched from a head of the list according to a first-in-first-out scheme.

* * * * *